(12) United States Patent
Karlsen et al.

(10) Patent No.: US 8,271,531 B2
(45) Date of Patent: Sep. 18, 2012

(54) EMPLOYEE TRACKING SYSTEM

(75) Inventors: Geir Christian Karlsen, Greaaker (NO); Baard Frode Ronningen, Methuen, MA (US)

(73) Assignee: Evolution Software, AS, Oslo (NO)

( * ) Notice: Subject to any disclaimer, the term of this patent is extended or adjusted under 35 U.S.C. 154(b) by 330 days.

(21) Appl. No.: 12/349,662

(22) Filed: Jan. 7, 2009

(65) Prior Publication Data

US 2009/0177688 A1    Jul. 9, 2009

Related U.S. Application Data

(60) Provisional application No. 61/010,474, filed on Jan. 8, 2008.

(51) Int. Cl.
  *G06F 15/02* (2006.01)
  *G06F 17/30* (2006.01)
(52) U.S. Cl. ............... 707/786; 705/32; 707/999.002
(58) Field of Classification Search ......... 707/797, 707/802, 999.006, 999.101, 786, 828, 999.002, 707/999.009; 709/203, 217; 705/32
See application file for complete search history.

(56) References Cited

U.S. PATENT DOCUMENTS

| | | | |
|---|---|---|---|
| 6,240,418 B1 * | 5/2001 | Shadmon | 707/696 |
| 6,965,928 B1 * | 11/2005 | Cox et al. | 709/220 |
| 7,051,012 B2 * | 5/2006 | Cole et al. | 705/3 |
| 2002/0175211 A1 | 11/2002 | Dominquez | |
| 2002/0184085 A1 | 12/2002 | Lindia | |
| 2005/0273381 A1 | 12/2005 | Thomas | |
| 2006/0020503 A1 | 1/2006 | Harris | |
| 2007/0050238 A1 | 3/2007 | Carr | |
| 2008/0195512 A1 * | 8/2008 | Klebanoff et al. | 705/32 |

OTHER PUBLICATIONS

European Patent Office, Extended European Search Report for Application No. 09000158.7, Apr. 22, 2009.
Tropashko, Vadim: "Trees in SQL: Nested Sets and Materialized Path", Internet Citation, Apr. 13, 2005, XP002427307, Retrieved from the Internet: URL:http://www.dbazine.com/oracle-or-articles/tropashk04 [retrieved on Mar. 28, 2007].
Extended European Search Report mailed Oct. 10, 2011, European Application No. 11001630.0-2221.

* cited by examiner

*Primary Examiner* — Marc Filipczyk
(74) *Attorney, Agent, or Firm* — Fox Rothschild, LLP; Robert J. Sacco; Carol E. Thorstad Forsyth

(57) ABSTRACT

An employee tracking system is disclosed, in which processing, accessing or both within the system is determined according to the hierarchical structure of the underlying organization. Each employee is associated with a node in the organization, and access to employee-related data is based upon the node associated with the requester and the node of the employee being checked, as well as the type of data being requested. Employees may clock into and out of work using mobile devices that interface with the employee tracking system host computer.

22 Claims, 34 Drawing Sheets

Max acceptable short-term illnesses (days): 9

Max acceptable long-term illnesses (days): 30

Arrive late/Leave early buffer (min): 10

Max available illness reports: 6

Store

EMPLOYEE TRACKING SYSTEM

CROSS-REFERENCE TO RELATED APPLICATIONS

This application claims the benefit of U.S. Provisional Application No. 61/010,474, filed on Jan. 8, 2008, the teachings of which are incorporated herein by reference.

FIELD OF THE INVENTION

The present invention relates generally to an employee tracking system. More particularly, the present invention discloses a system that permits users to track employees in a user-friendly manner that is consistent with the structure of the organization.

BACKGROUND OF THE INVENTION

Many organizations today employ various types of systems, such as time management systems, personnel management systems, accounting systems and the like to maintain and track resources within the organization. Of particular concern is the tracking of employee performance statistics, such as absenteeism. In some companies, absenteeism can be as high as 10%, and hence may present a significant financial drain. Adequate monitoring and, when necessary, following up, of employees may be critical to maintaining corporate efficiency.

Additionally, presenting such statistics in a dynamic and user-friendly manner in the context of the underlying organizational structure is also important to assist management in both tracking and following up with employees. Because different systems may assume different organizational structures, such presentations may be quite challenging.

It would therefore be desirable to provide a system that is capable of interfacing with other systems to both track employees and present results in a manner that is easy to understand and consistent with the organizational structure.

SUMMARY OF THE INVENTION

Various aspects of an employee tracking system are disclosed. In one embodiment, an employee tracking system is disclosed that includes a computer system with program code that causes the computer system perform various steps. These steps include, for each of a plurality of employees, storing corresponding employee-related data in an employee statistics database. Each employee is associated with at least one node in a hierarchical tree that represents the organizational structure for which the employee works, in which the organization structure may be represented by a hierarchical tree comprising a plurality of nodes. Each employee may thus be associated with a node in this tree. The hierarchical tree is used to access, or determine access rights of, the corresponding employee-related data of one or more employees. The employee-related data of an employee is then compared against performance management rules stored in the computer system. Finally, the program code causes the computer to generate a report comprising information of employees not in conformance with the performance management rules.

In certain embodiments, utilizing the hierarchical tree to access corresponding employee-related data includes the steps of determining a hierarchical position in the hierarchical tree of a node corresponding to a user requesting the data; utilizing the hierarchical position of the node corresponding to the requesting user to determine access rights to employee-related data, and using or analyzing employees for which the access rights to the corresponding employee-related data is permitted.

In other embodiments, each node in the hierarchical tree may have a corresponding set of performance management rules, and each employee is compared against the corresponding performance management rules for the node with which the employee is associated.

In preferred embodiments, an employee tracking system further comprises one or more mobile devices in communications with the computer system. Each mobile device includes input/output circuitry, a clock-in circuit for generating a clock-in signal according to data received from the input/output circuitry, a clock-out circuit for generating a clock-out signal according to data received from the input/output circuitry, and a radio frequency circuit for transmitting data related to the clock-in signal and the clock-out signal to the computer system unit via a wireless network. Employees may thus use respective mobile devices to clock into and out of work, work-related tasks, or both.

A system and related method for managing a relational database that stores hierarchical information is disclosed. The system comprises a central processing unit, and memory in communications with the central processing unit. The memory includes a database storing hierarchical information in a plurality of records, each record comprising at least a first field and a second field. The memory also includes program code to cause the central processing unit to perform the following steps:

(a) Selecting as a processing record a record in the database corresponding to a root node of the hierarchical information.

(b) Setting the first field in the processing record to a value corresponding to a sequence variable and then incrementing the sequence variable.

(c) Determining if a node in the hierarchical information corresponding to the processing record has any children nodes, and if so, selecting as the processing record a record in the database corresponding to one of the children nodes and then jumping to step (b).

(d) Setting the second field of the processing record to a value corresponding to the sequence variable and then incrementing the sequence variable.

(e) Determining if a node in the hierarchical information corresponding to the processing record has any unprocessed sibling nodes, and if so, selecting as the processing record a record in the database corresponding to one of the unprocessed sibling nodes and jumping to step (b). And, (f) Determining if a node in the hierarchical information corresponding to the processing record has a parent node, and if so, selecting as the processing record a record in the database corresponding to the parent node and jumping to step (d).

BRIEF DESCRIPTION OF THE DRAWINGS

FIG. 4 is a screen shot of an embodiment user interface permitting a user to specify rules for an employee tracking system.

FIG. 14 shows an interface that permits a user to select a graphical-type report.

DETAILED DESCRIPTION

Various embodiments provide methods and systems for tracking employees. Employee statistics may be obtained from the employees themselves as they interface with an embodiment system and may also be obtained from other resource management systems. In certain embodiments, the following steps may be performed: a) creating an employee profile; b) identifying organizational and dynamic structure based upon data obtained from other management systems; c) defining performance management rules; d) defining a coded calendar overview; e) providing both employee assessment tools and employee management tools; f) automatically modifying the organizational structure, employee data or both according to predefined rules, previous scheduling and scheduling approval iterations; g) determining a ranking value of generated or modified employee-related data that is based upon adherence to the predefined performance management rules or interpretations of the rules; h) repeating elements f) and g) and determining if there are any improvements in ranking values via the employee management tools; and i) publishing organizational performance goals at selected levels of the organizational structure, such as via the coded calendar overview. The calendar may be color-coded, for example, to present report results in a format that can be quickly grasped. Other coding methods, however, may also be employed, such as using certain symbols, text or the like.

Figure 1:
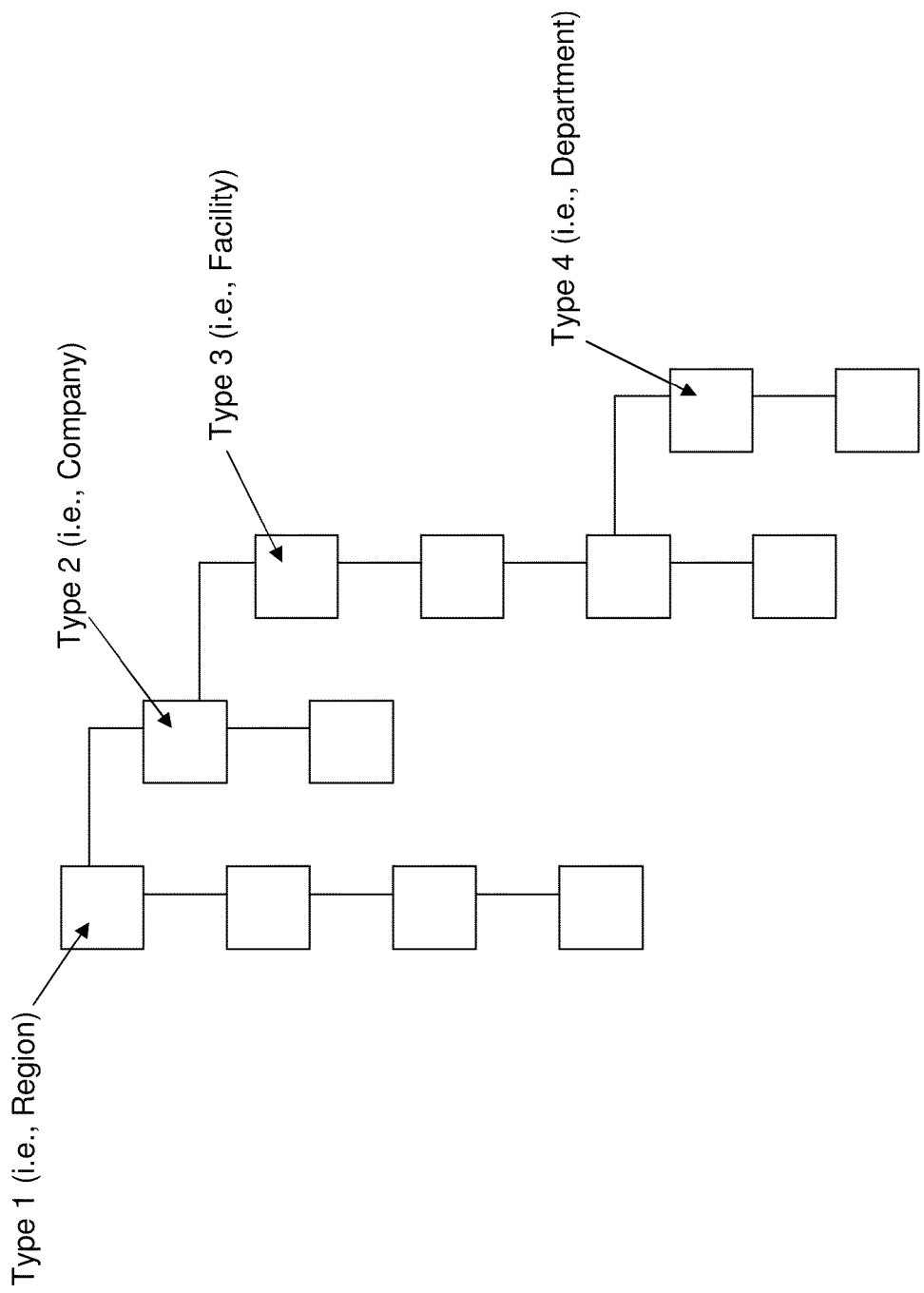
FIG. 1 is an example tree-like hierarchy showing various levels in the hierarchy.
Figure 2:
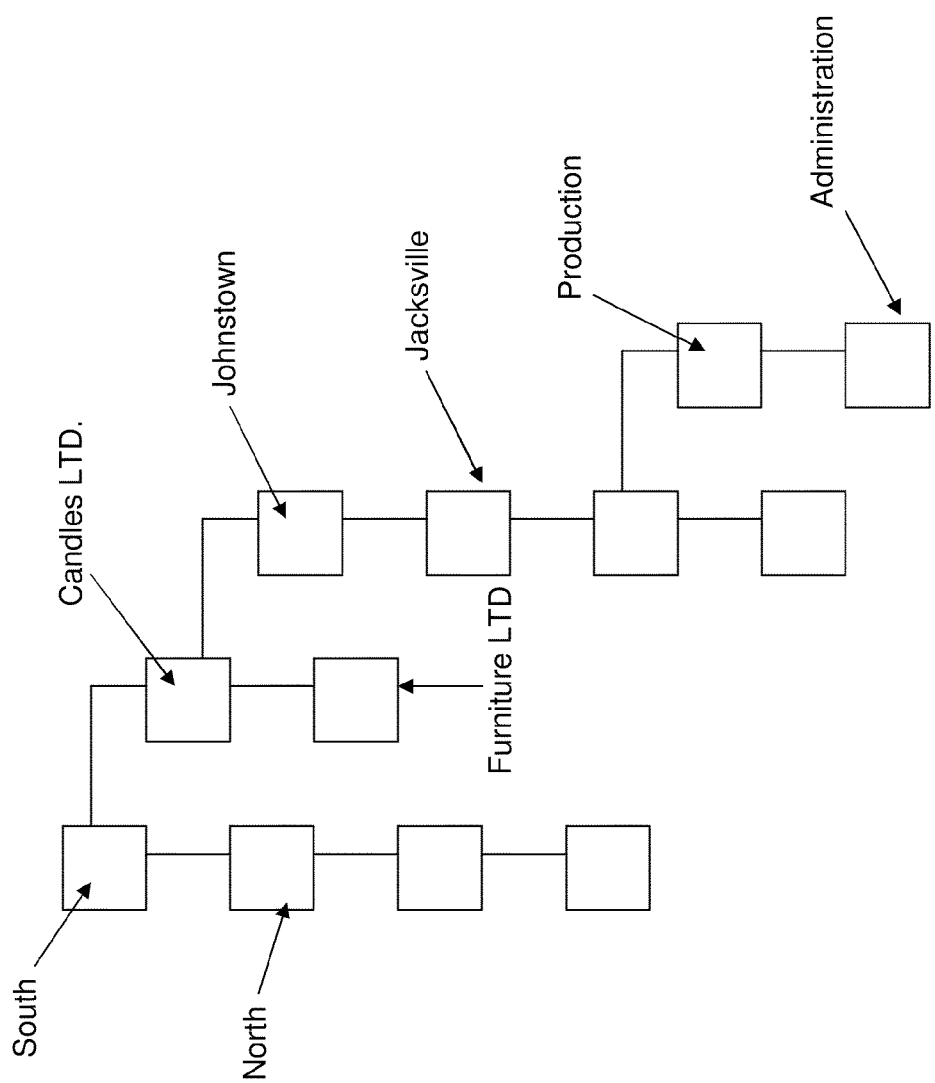
FIG. 2 shows the tree of FIG. 1 in which specific names have been associated with various levels and nodes of the tree.

An organization may be presented as a tree-like structure. An example of such a structure is shown in FIG. 1. FIG. 2 presents the structure shown in FIG. 1 with names instead of types. Recognizing the need to create a visible representation of an organization, various embodiment systems generate an organizational tree, where each "node" in the tree represents different parts of the whole organization. By dynamically classifying the different nodes in the tree, it is possible to generate structures for totally different organizations. For example, a company might need types like: "Region→Factory→Department", whereas a soccer organization may use: "Country→Region→Team". Nevertheless, the embodiment systems are satisfactory for all types of organizational trees. Various embodiments utilize data obtained from other management systems, such as time management systems, accounting systems, personnel management systems and the like to dynamically extract the structure of an organization. Various embodiment applications place departments of the organization in a tree-like structure, where each department is a branch or a leaf in the organizational tree. Employees are allocated to their respective departments or nodes. In preferred embodiments, employees are attached to the outer nodes of the tree, such as node type 4 indicated in FIG. 1. Each department may be assigned a department ID (and hence each node in the tree may have a corresponding department ID), and each employee may be associated with the corresponding department ID of the employee's department. Single departments, or whole branches, can be moved around in the tree, and since the employees remain tied to the same department, the structure in embodiment applications does not need to look the same as the structure the organization uses in other applications. Preferably, however, the department IDs used in the system 10 are the same as those used in the other management systems. If the organizational structure cannot be determined, or is incorrectly determined, the system 10 provides a user interface that permits a user to specify the organizational structure, such as by moving departments around, creating nodes, children and ancestors, etc., and associating employees with their departments via the department IDs.

Figure 3:
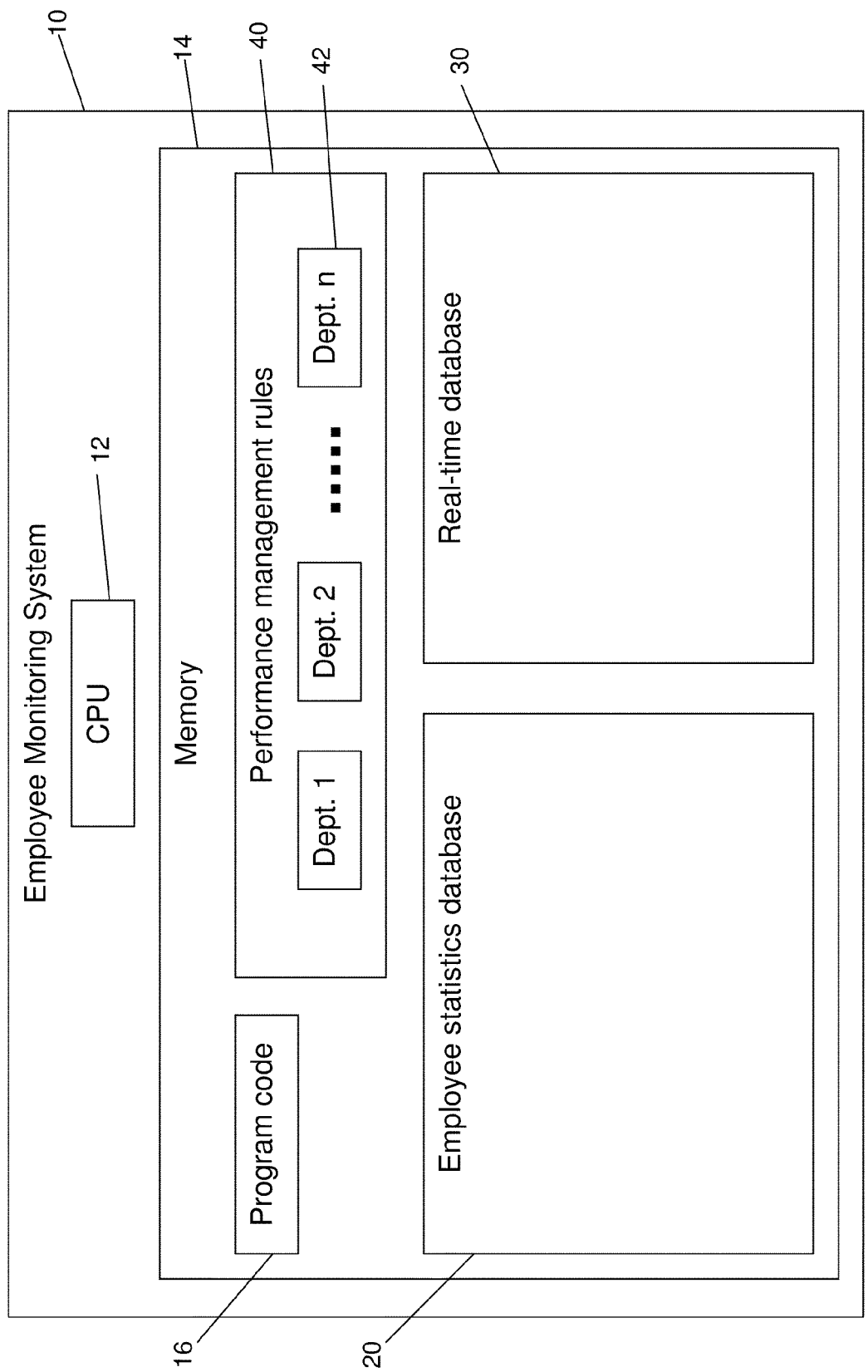
FIG. 3 is a diagram of an embodiment employee monitoring system.

An embodiment system 10, shown in FIG. 3, may include a central processing unit (CPU) 12 in communications with memory 14. The memory 14 may include both volatile and non-volatile memory components as known in the art. The memory 14 may include program code 16 executable by the CPU 12 to perform steps in accordance with an embodiment method. The memory 14 may also include an employee statistics database 20 and a real-time database 30. It will be further appreciated that they memory 14 may store session information for web-based applications or embodiments. Any suitable database encoding and access technologies may be used for the databases 20, 30. It will be appreciated that the system 10 may include multiple CPUs 12, and that the databases 20, 30, 40 may be distributed across multiple computing platforms, as known in the art; FIG. 3 thus shows a relatively simple embodiment system 10 for the sake of clarity. It will be further appreciated that the program code 16 may be directly executable by the CPU 12, as with object code, or indirectly executed by the CPU 12, as with HTML, JavaScript, Flash and other web-based programming languages and applications. Hence, program code 16 indicates any set of logical instructions that are processed by CPU 12 to cause the CPU 12 to perform the steps desired of embodiment methods and procedures. The employee statistics database 20 is used to store cumulative employee-related data for each employee within the organization, and may include information that relates the employee to a specific node or department within the organizational tree. The real-time database 30 is used to store real-time information about each employee within the organization. The real-time database 30 stores the most current information known about each employee, and may be used to cumulatively update the statistics database 20.

Users may interface with the system 10 directly via standard input/output devices, such as a keyboard, monitor and mouse, using standard user interface technologies known in the art, or via another computer that is in networked communications with the system 10, using a combination of networking technologies and user interface technologies as known in the art. The system 10 may provide a login feature for users, as known in the art, and manage access and security based upon the login identity of each user. When logged in, the login identity of the user may be used to determine which node in the organizational tree the logged in user is associated with.

As shown in FIG. 4, the program code 16 may provide a user interface that permits certain selected requesting users (such as system administration users) to enter and generate performance management rules 40. The rules 40 may specify, for example, absenteeism targets, the number of acceptable days of absence for each employee per predefined time period for each type of leave (such as maternity leave, sick leave, etc.), the number of acceptable consecutive leave days per employee for each type of leave, when follow-up with an employee is required due to excessive absenteeism, acceptable limits on tardy behavior, etc. For example, by setting in the management rules 40 the amount of acceptable short-term absence to 14 days, a manager logged into the system 10 may be provided with a list of all employees under that manager, or with whom that manager has access permission, that have incurred more than 14 days of short-term absence in the last 6 months on the entry page presented by the system 10 when the manager logs into the system 10. That is, the program code 16 may be coded to cause the CPU 12 to scan the employee statistics database 20 to determine which employees the logged-in manager, a requesting user, has access permissions to see or track, and then for each of these employees scan the employee statistics database 20 against the performance management rules 40 to determine which of the employees is not in conformance with the rules 40. The program code 16 may then cause the CPU 12 to present to the logged-in manager (i.e., the requesting user) a list or report of such non-conforming employees. As explained in greater detail below, access to employee-related data 20 may be determined based upon the hierarchical position in the organizational tree of the requesting user in relation to that of the employee being checked.

Certain embodiments also provide settings for long-term illness, illness-reports and a grace period in minutes available to an employee before the employee is flagged as arriving late or leaving early. That is, the program code 16 may be coded so as to cause the CPU 12 to present a user input interface to permit a user with access permissions to the rules 40 to augment or modify the rules 40 to provide rules 40 for long-term illness, illness-reports and grace periods, and which other portions of the code 16 may then use to scan against the employee statistics database 20 to find non-conforming employees. Hence, in the following, it should be understood that when describing various aspects of an embodiment method or task performed, corresponding code within the program code 16 may be provided to cause the CPU 12 to perform the tasks or methods so described. Providing the program code 16 should be routine for one of ordinary skill in the art after having the benefits of the instant disclosure.

Figure 8:
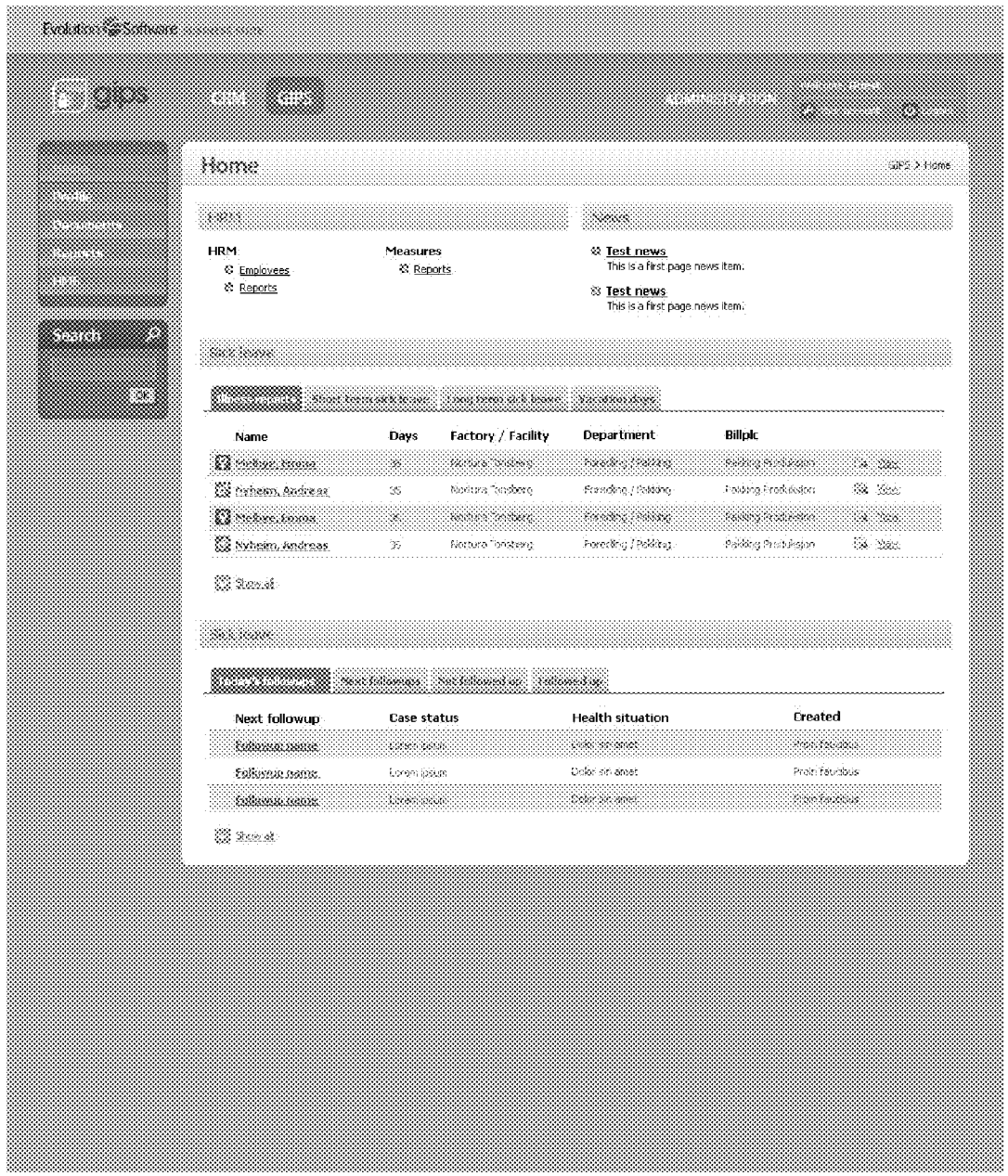
FIG. 8 shows an embodiment user interface listing employees.

FIG. 8, for example, shows an embodiment entry page that a manager may see when logging into the system 10. By clicking on various tabs, such as "Short term sick leave", "Long term sick leave", "Vacation days", "Illness reports" and the like, a manager may be immediately presented with a list of employees that have exceeded the respective rules 40 corresponding to that tab. Similarly, the entry page may present tabs relating to employee follow up procedures, permitting the manager to view a list of employees that are to be follow-up today, tomorrow, who have not been followed-up, etc. Such follow-up procedures may be helpful in the long term in keeping rates of excessive absences low. It will be appreciated that in various embodiments all data related to an employee used in the various methods or aspects, including employee follow-up data and the like, may be stored in the employee statistics database 20.

In certain embodiments, each organization or department (i.e., a node in the organizational structure) may have different views on what is acceptable and unacceptable when it comes to employee absences. In these embodiments, the system 10 permits each organization or department to define their respective rules 42 to better tailor the system 10 to their needs. Hence, employees associated with a node in the organizational structure are compared against the corresponding rules 42 for that node to determine compliance. By way of example, a coded calendar may be considered, in which a code flag on the calendar is made when an employee arrives at work too late, or goes home too early. The acceptable margins for such employee behavior may depend on the organization or department (i.e., rules for that node); some may desire a flag to be shown if the employee is more than 5 minutes late in arriving or early in leaving; others may desire a flag at the 15 minute mark. As another example, reports may show a color-coded view of average absences. In such embodiments, an organization or department can define what level to flag as red/green, etc. Such settings may be set by the user from a configuration page provided by the system 10 and stored, for example, in the performance management rules 40.

Figure 5:
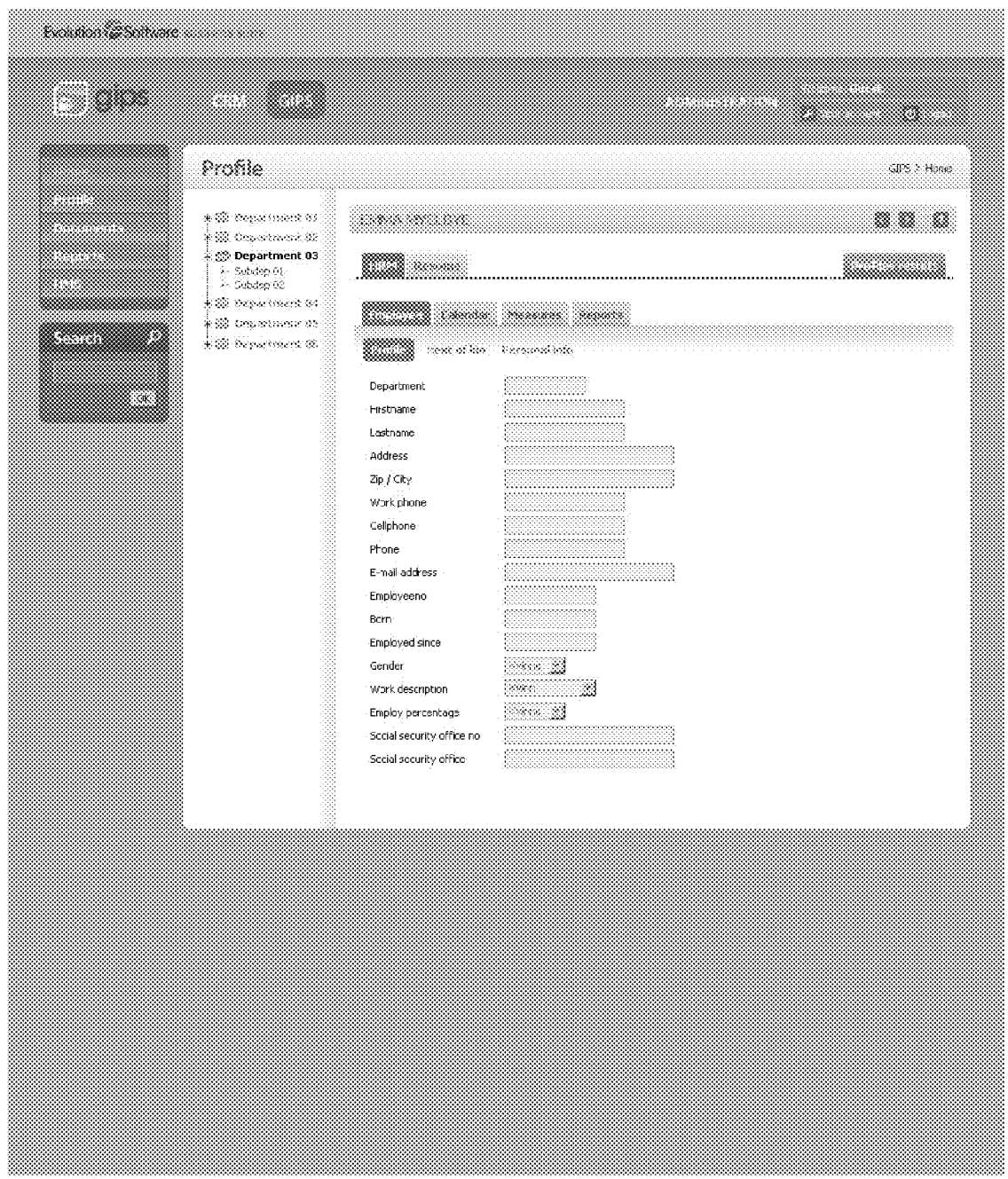
FIGS. 5 and 6 are screen shots of an embodiment user interface that permits a record of employee data to be filled.
Figure 6:
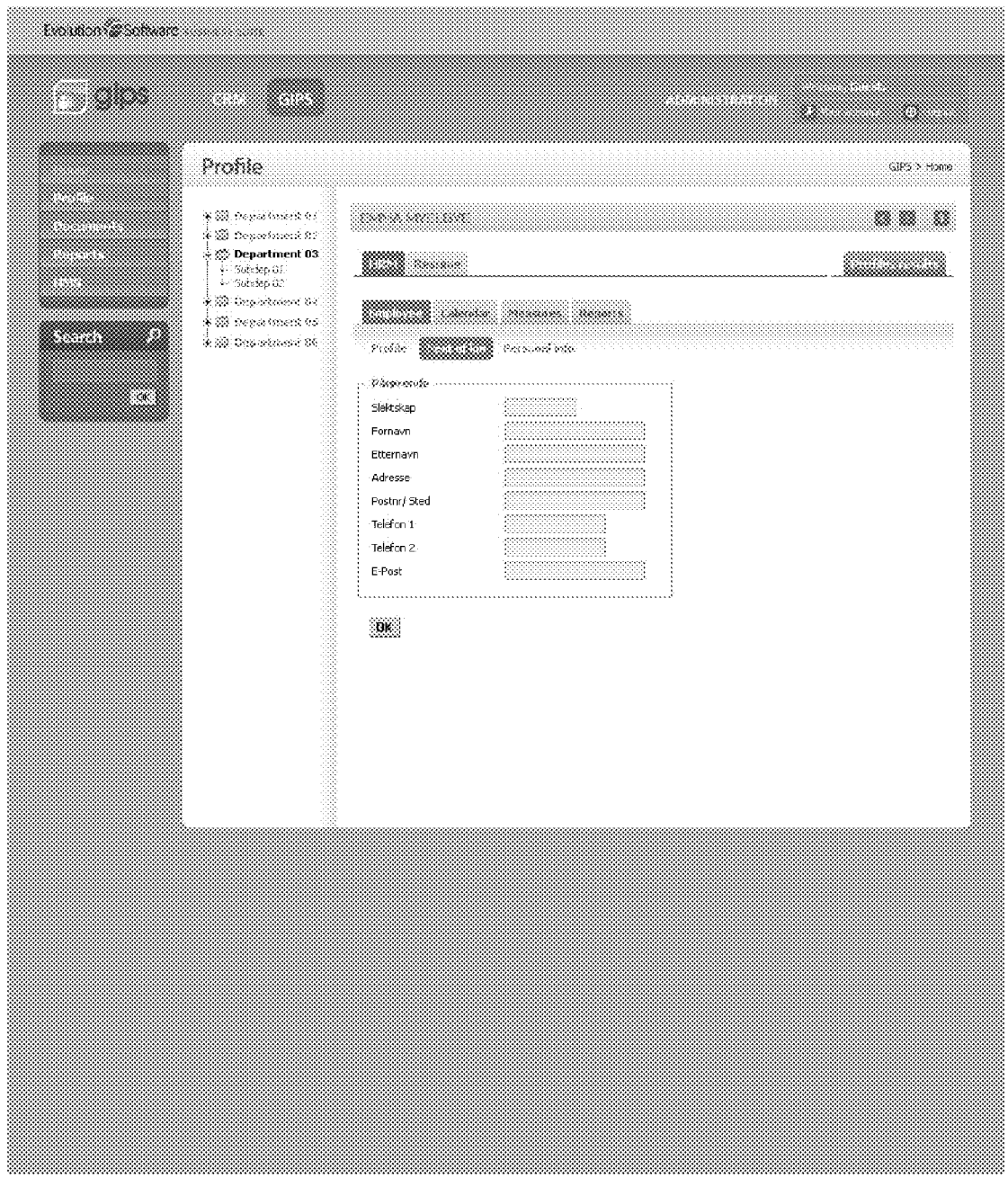
Figure 7:
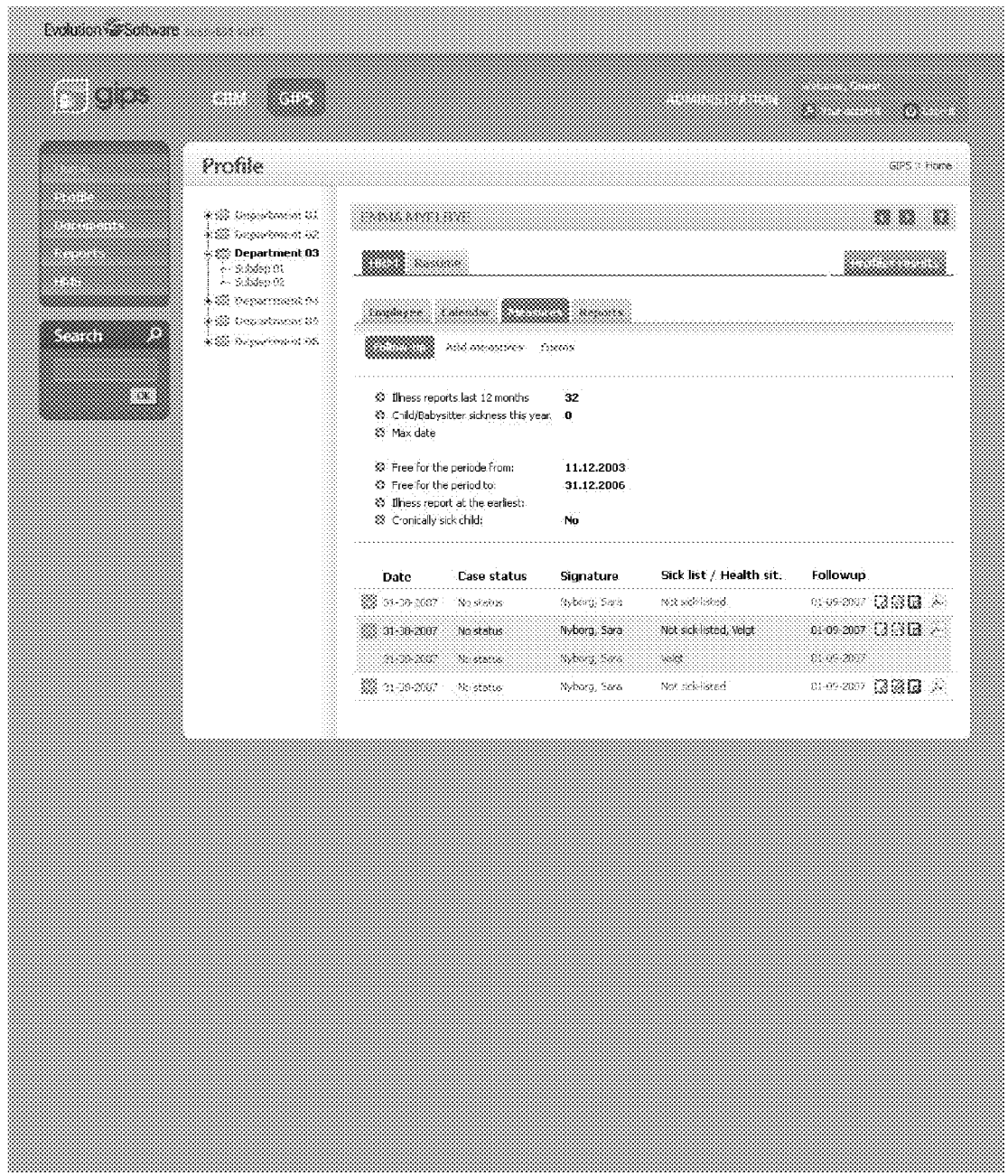
FIG. 7 is a screen shot that shows an employee report providing a summary of times in which the employee was not at work.

The system 10 may, for each employee, generate a corresponding record for that employee, which may be stored in the employee statistics database 20 and which holds employee-related data for that employee. The record may be generated automatically by the system 10 from data obtained from other management systems, such as from the company's salary management system, a website or the like. Information obtained by such systems may be correlated, for example, using the employee ID. Alternatively, as shown in FIG. 5, the system 10 may present a user interface that permits a user to manually enter employee-related data for the corresponding record of the employee. Each record may be filled with work-related information about the employee, such as the employee's name, identification number, the department ID with which the employee is associated, and so forth. As shown in FIG. 6, each record may have additional contact information, such as the employee's next of kin. As indicated by FIG. 7, each record may also contain data related to the work times of the employee, such as when the employee took vacation time, sick time, maternity leave, unexcused absences and the like, and whether or not another employee with the organization followed-up such leaves and/or absences, if necessary. Whether or not a follow-up is necessary may be determined, for example, from the rules 40 that may be input by an administrator for the organization or department. Manual entries by personnel related to such follow-up procedures may also be recorded. Each of these time-types may be further sub-divided. For example, sick time could be sub-divided into personal sick time, sick time due to a spouse or child, sick time due to a chronic condition, etc. Dates and hours for these time-types may be recorded.

Figure 9:
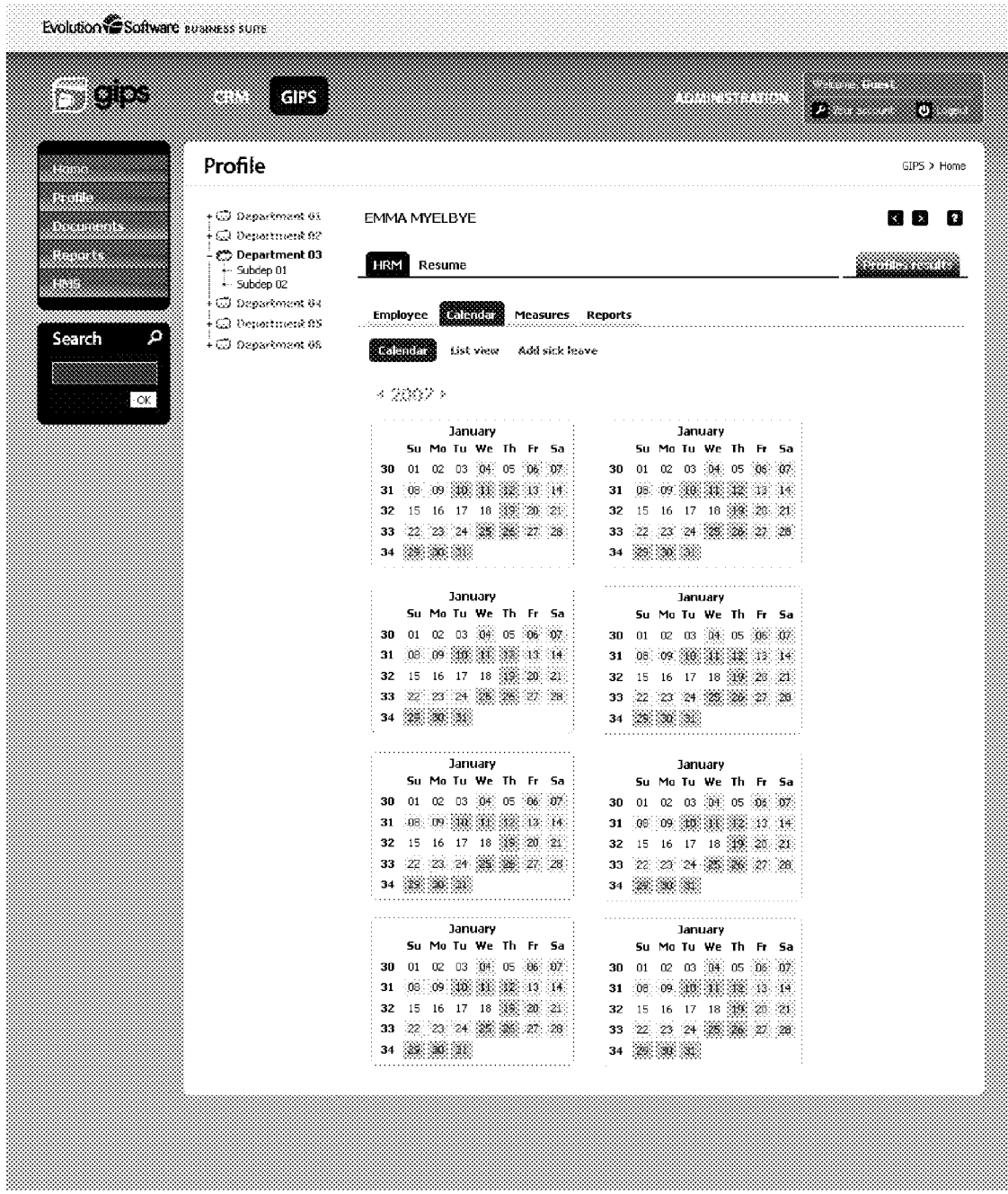
FIG. 9 shows a calendar color-coded with information related to the conduct of an employee.
Figure 10:
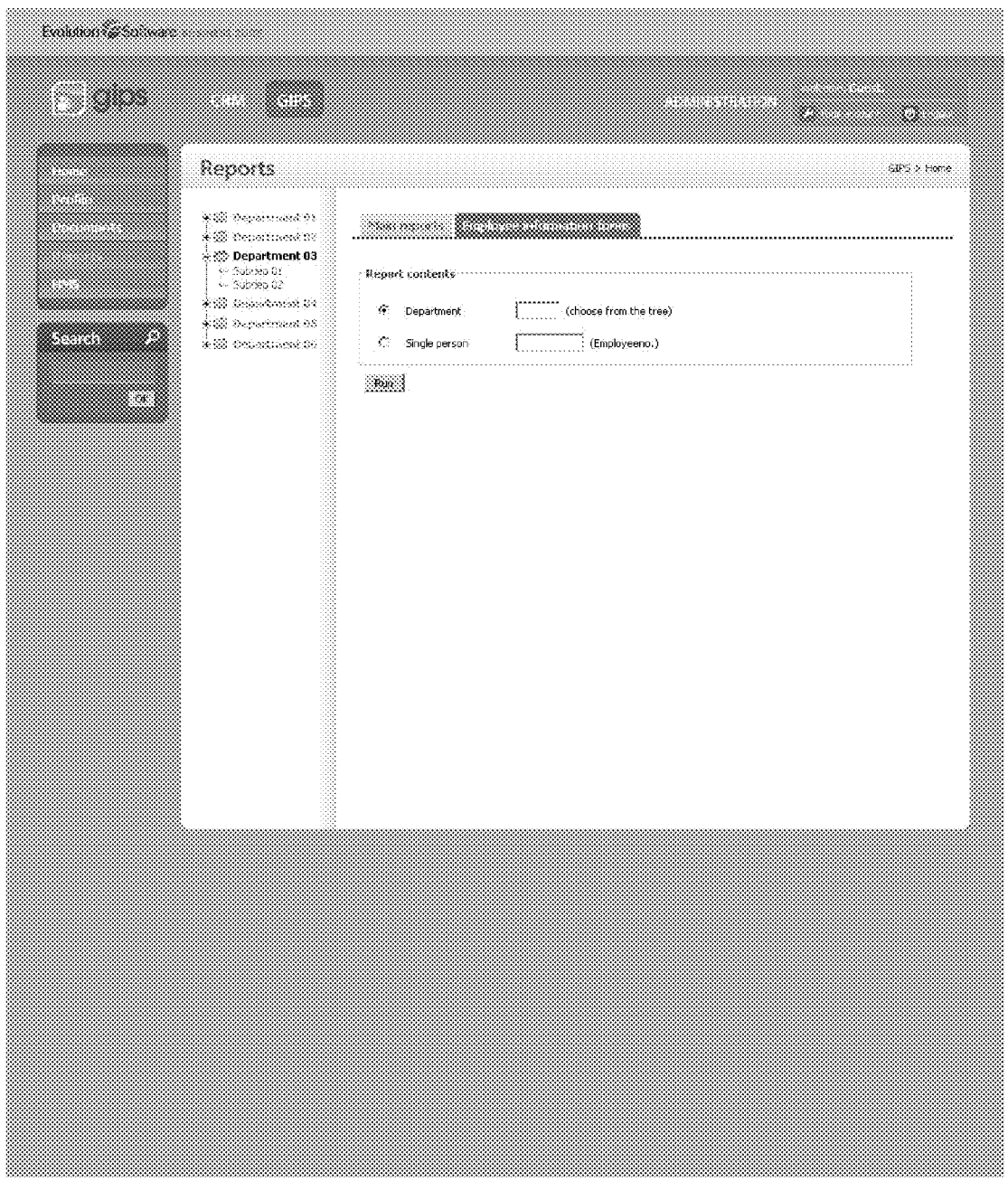
FIG. 10 shows selection of a node in a hierarchical tree upon which a report is to be run, with specific reference to reports on an entire department.

Using the performance management rules 40 and the employee statistics database 20, the system 10 can generate reports for each employee. For example, if an employee exceeds the maximum number of unexplained absences in a certain period of time, as defined by the rules 40, then a entry of such may be recorded and stored in the database 20. When logged in, the system 10 may present to a manager of the employee a notification, and that a follow-up procedure is required. As shown in FIG. 8, the system 10 may present a user interface that lists employees that the requesting user is permitted to view, and provides the option to generate a report for any of the listed employees. Based upon the type of view selected, the user interface may indicate the total number of sick days for each employee (further sub-categorized by type), the number of vacation days, etc. Moreover, as shown in FIG. 9, the system 10 can generate a coded calendar in which each day of the calendar contains a coded entry, such as a color-coded background or the like, based upon the work-related conduct of an employee as compared to the rules 40. Similarly, as indicated in FIG. 10, the system 10 can generate reports on entire groups, such as departments, in which a summary of all employees within the group is provided.

As previously indicated, the hours and sick days of an employee may be recorded manually directly into the system 10, or imported from an external management system, such as an hour tracking system, a web service, or the like. When imported, the data may come in two formats: 1. the data is "untreated", meaning it contains a record of every clocking action the employee did throughout the period; or 2. "treated" data. When importing "untreated" data, certain embodiment system 10 periodically, such as daily, run a script that computes when the employee first clocked in, and when the employee last clocked out, as well as any sickness codes that were used during that period. Having done this, the system 10 may then store the results in a separate table that that may be used, for example, for the coded calendar. "Treated" data may be hour and sick day data obtained from, for example, an hour tracking system that has already been processed; therefore, such pre-processed data may be directly imported into the coded-calendar table without the system 10 performing any additional processing of the data. "Treated" data is relatively easy to use, but it does prevent the system 10 from being able to display individual clocking actions, and thereby limits the information available to managers via reports.

Figure 11:
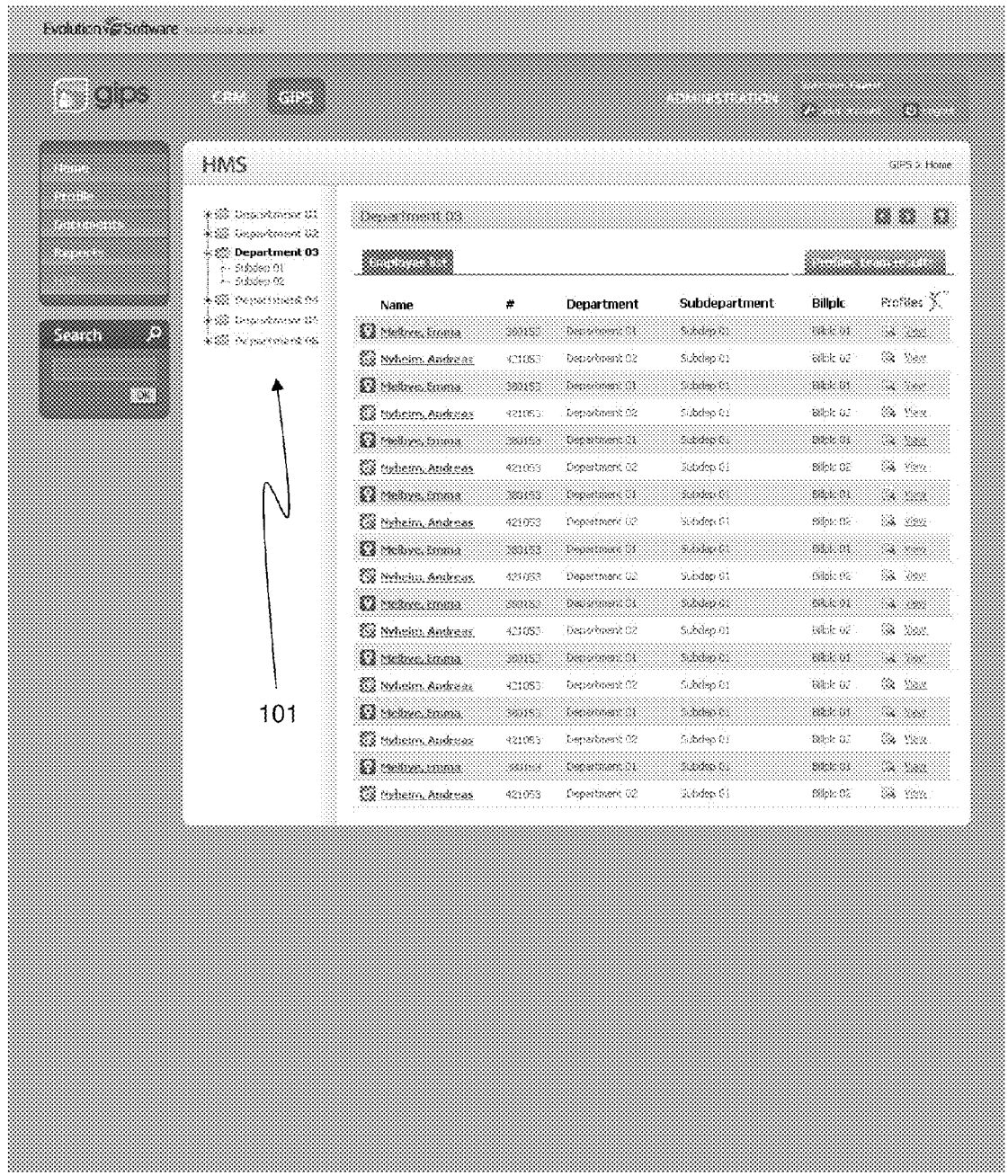
FIG. 11 shows selection of a node in a hierarchical tree from which a list of employees is desired for selection of an employee report.
Figure 12:
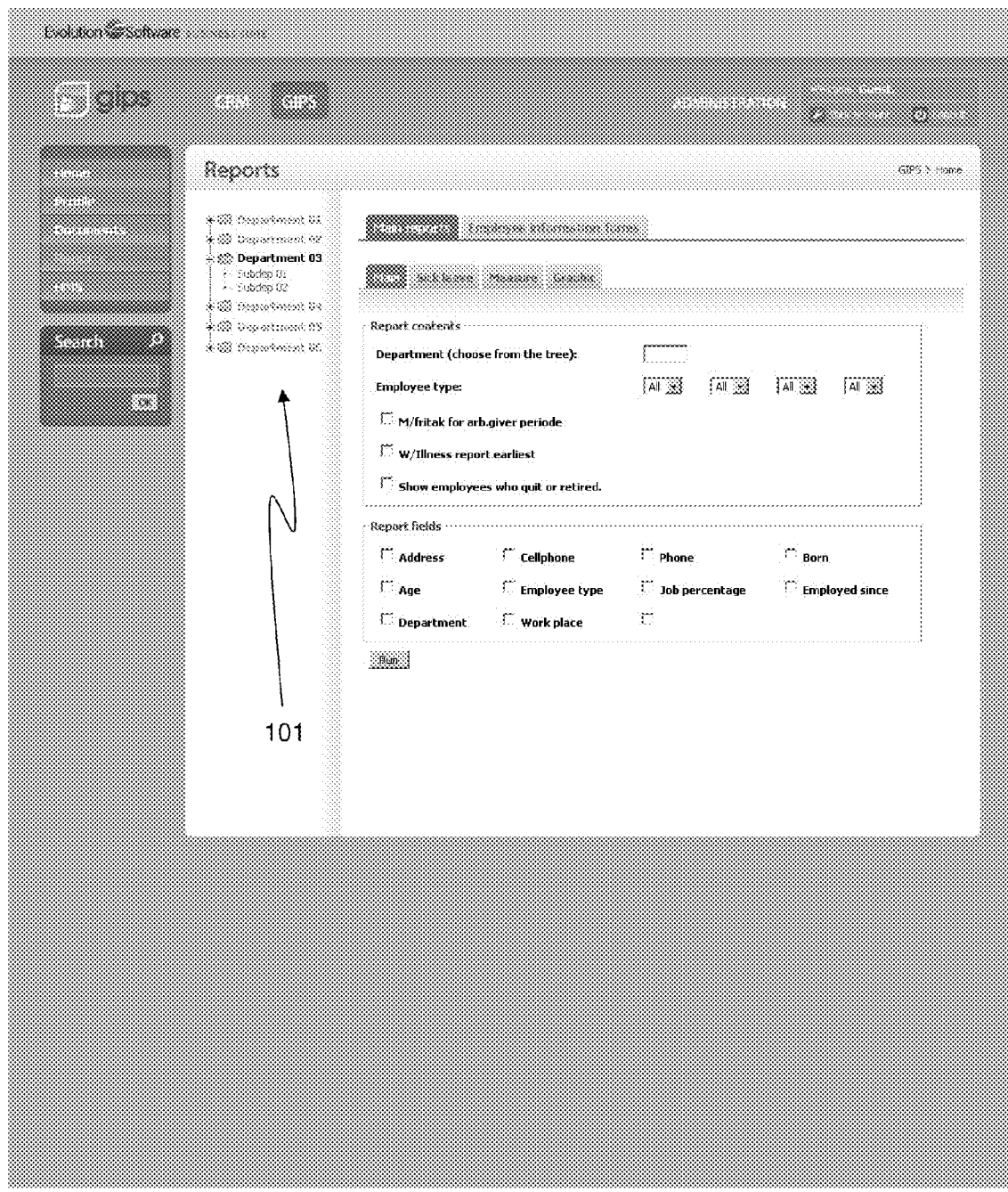
FIG. 12 shows selection of a node in a hierarchical tree to perform a departmental report.

An advantage provided by the system 10 is when it comes to reports that are generated for different parts of an organization. The system 10 utilizes knowledge of the tree-like structure of an organization to permit a user to control the size and extent of the organization the report will include, to select employees, or both. For example, as shown in FIGS. 11 and 12, the system 10 may present an image 101 of the organizational structure, and a user may click on a node for which he or she desires a report, or a list of employees the user desires to view based upon the node selected. The report could also include reports for each node or nodes under the node that is selected. For example, by clicking on a factory node, a user could recursively obtain a report on all nodes attached to the factory.

Figure 13:
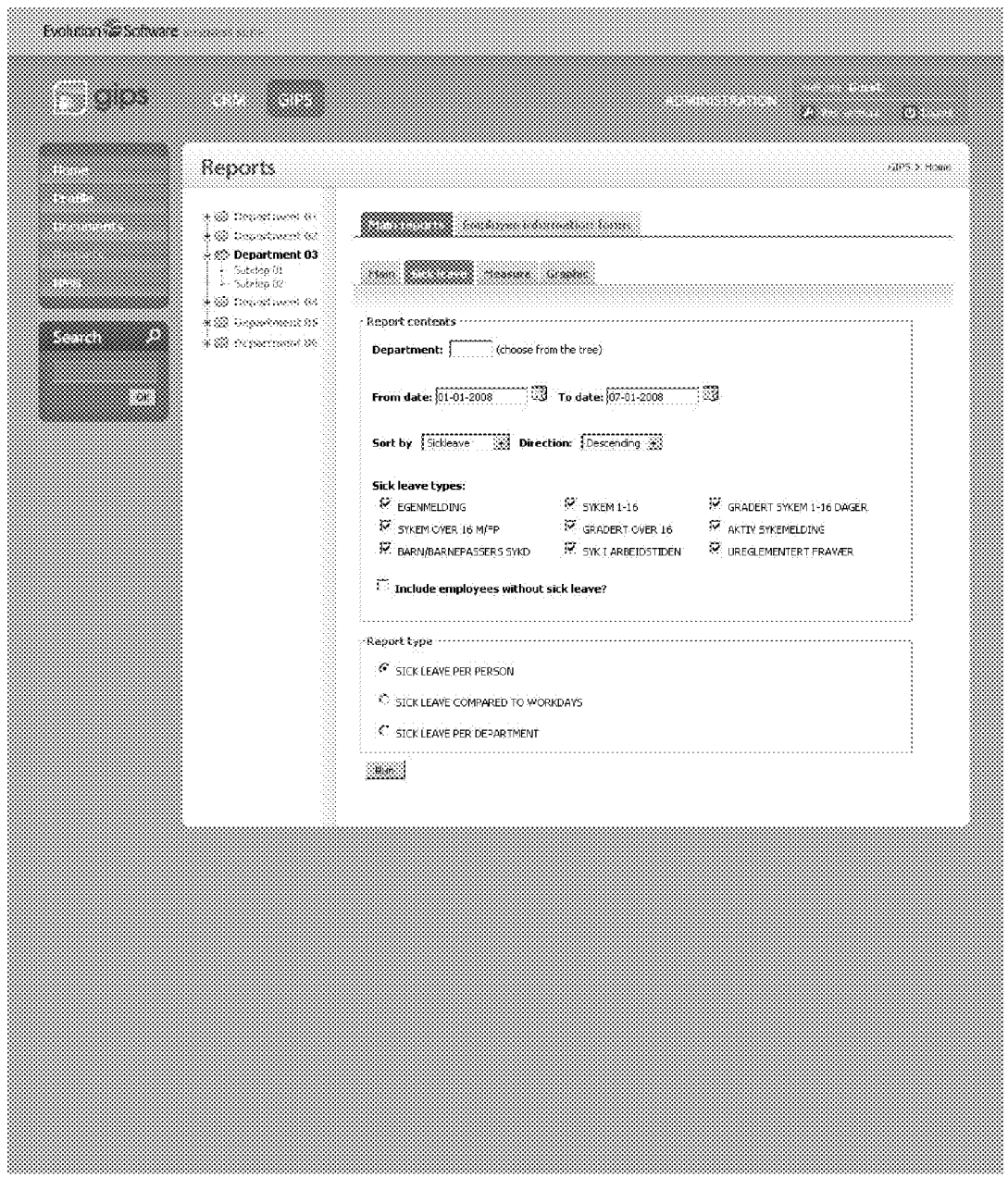
FIG. 13 shows a user interface that permits a user to customize how a report is performed.

In various embodiments, the reports may be designed to provide dynamic output. That is, a standard report may be easily modified by providing simple options to the user, and hence the layout and content of a report may be customized as the user desires. As shown in FIG. 13, for example, a user may customize a sick leave report by selecting certain checkboxes, radio buttons and date entry fields. By way of further example, an 'employee list' can be customized to show employee-lists from all parts of the organization, but the user may also be able to select what additional information to display for each employee in addition to the default showings of employee ID number and name, as indicated in FIG. 12. In this manner, the system 10 permits multiple reports to be compressed into a single report.

Figure 14:
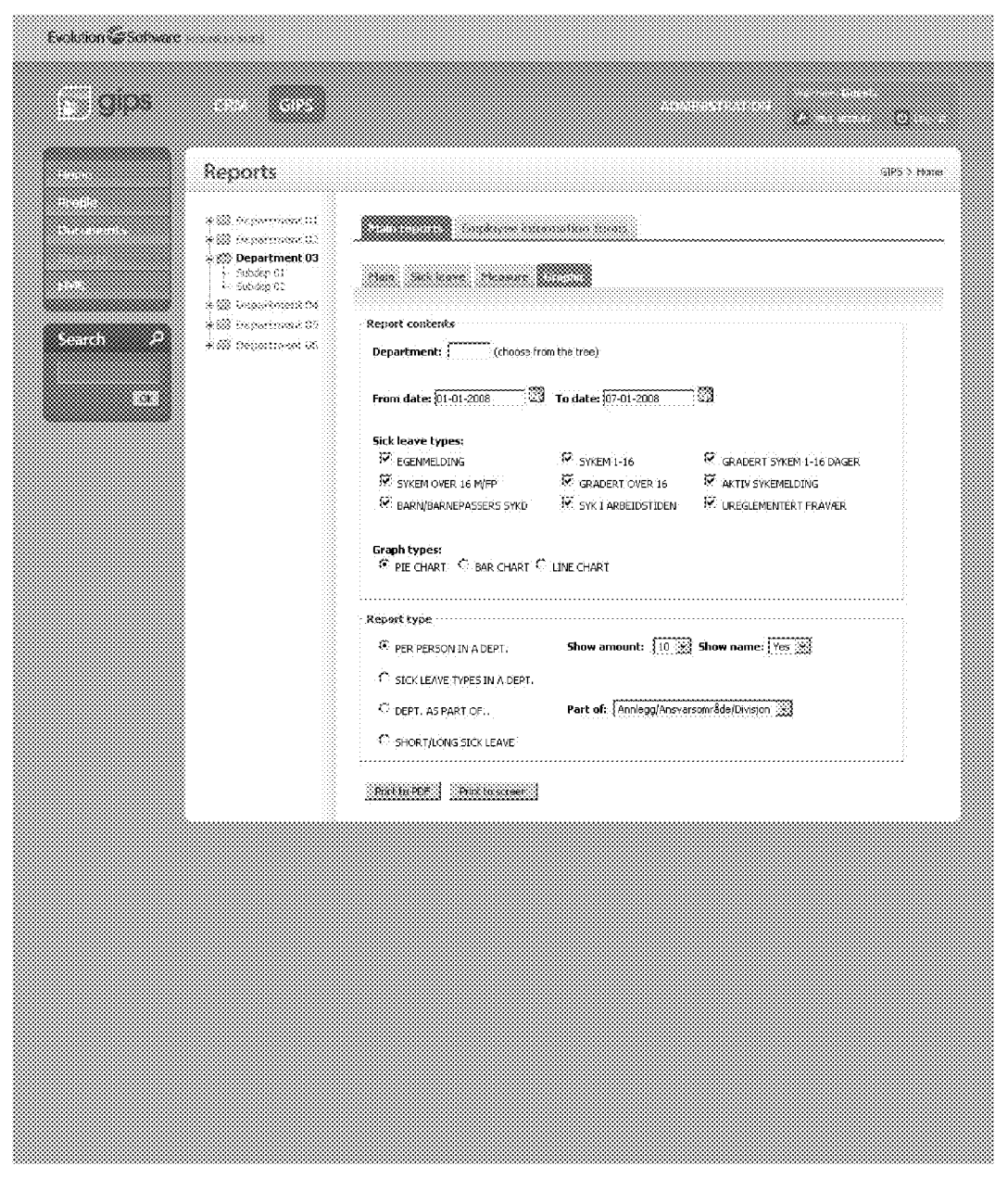
Figure 15:
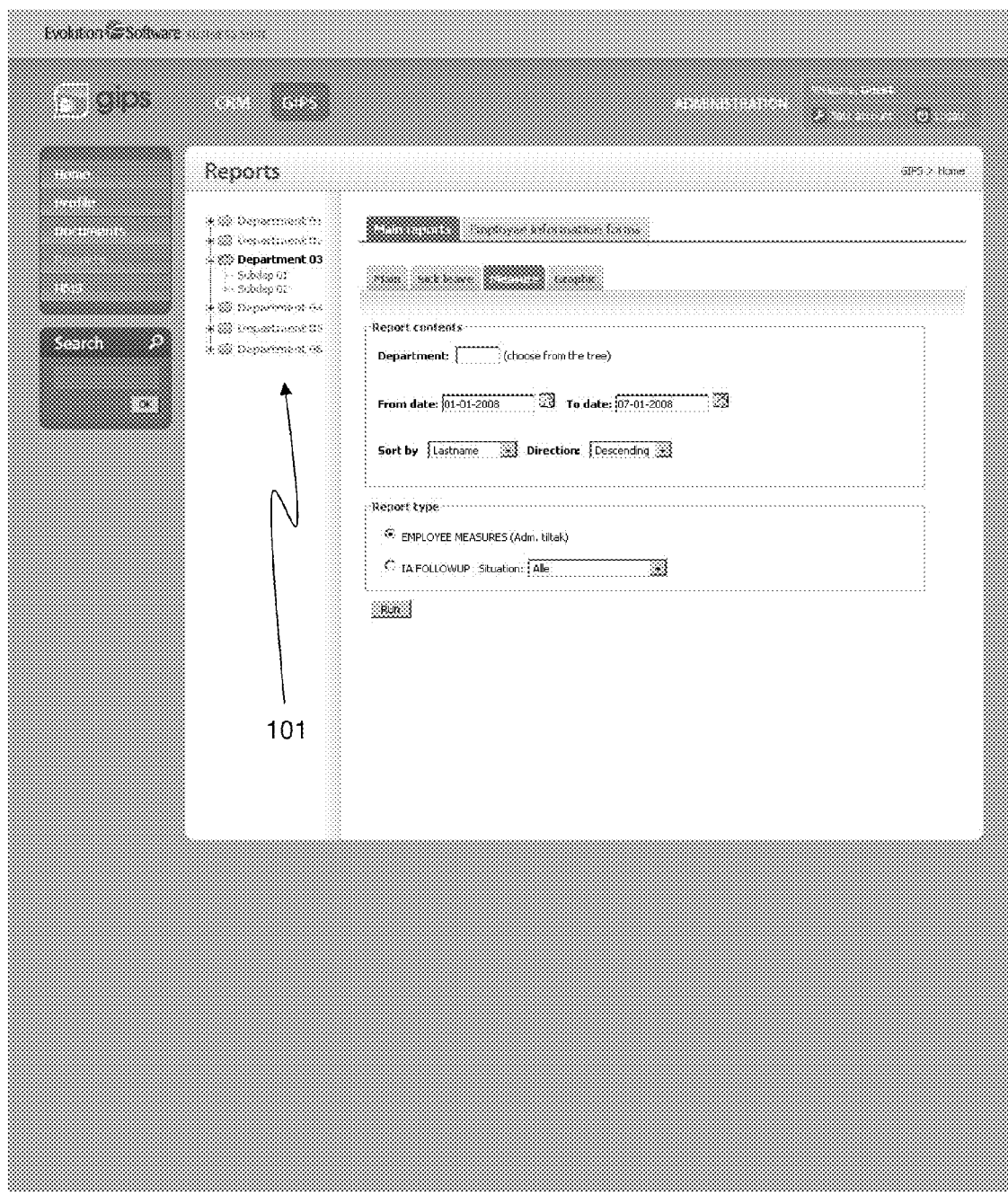
FIG. 15 shows an interface that permits a user to select a report that provides information on measures taken with a selected subject.

Certain embodiment systems 10 permit different types of reports to be generated. As shown in FIG. 13, for example, the user may request reports that detail the types of sick leave incurred by the employees in one or more departments over a period of time selected by the user. Alternatively, the user may select reports based upon the performances of departments as a whole rather than on specific employees. As shown in FIG. 14, the system 10 may present a user interface that permits the user to select a graphical presentation for a report, such as a pie chart, bar chart, line chart or the like. The graphical presentation may relate to, for example, sick time incurred by a department or employee, such as the amount, types, breakdown by person, breakdown by department, by type and so forth. The graphical report may displayed on a monitor, printed, or output in a predefined file format, such as a PDF file. As shown in FIG. 15, another report type may provide information on measures taken with employees, such as follow-up discussions in response to excessive absenteeism, sick leave or the like, and may optionally include any additional details or data input by the follow-up personnel. In the above, when running a report on a department, for example, the department may be selected by clicking on the respective node in a tree 101 of the organizational structure visually presented on the report page.

The system 10 may present reports to the requesting users on a monitor for viewing, may print the reports, or may provide the reports in a file having a predefined format, such as an Excel spreadsheet format. Depending upon the type of report requested, the report may include, for example, the total number of hours for each type of leave for each employee, or the total number of hours for each type of leave for each department, the amount of sick leave in comparison to work days for each employee, the amount of sick leave in comparison to work days for each department, or the like. Exactly what types of leave are included in the report, and other details of the report, are selectable by the user via the user interface, as shown in FIGS. 12-15.

The structure of the organization may also be used to control access to the system 10. For example, it may be desirable to permit each employee access to the system 10 to generate a report about his or her individual performance statistics. It may also be desirable to permit employees within a single department to know certain work-related aspects about other employees in that same department. However, it may not be desirable to permit every employee unfettered access to information about all other employees in the organization. To control access, in certain preferred embodiments, each employee's access to the system 10 is limited according to his or her position within the organizational tree. As previously explained, employees may be attached to the outer departments or nodes of the tree (such as type 4 shown in FIG. 1). The rules 40 may then specify how far "upwards" in the tree each employee has access to. That is, in certain embodiments each employee may have access to those employees that are in the same node as that employee, and to those employees a predefined distance "up" in the tree, and to those nodes "below" the employee's node in the tree. Hence, most employees may have only a few nodes available to select from since the majority may be department managers and the like. Additionally, the rules 40 may further specify that certain employees not appear on lists or reports. Using knowledge of the organizational tree-like structure makes it easy when moving nodes (i.e. departments) around in the tree, because when a department is moved to another factory (node), it is not necessary to change access rights; each employee will then have access to those employees attached to the factory (node) the department was moved to.

The most recently-available information about an employee may be entered into the real-time database 30. Employees may be granted access to the real-time database 30 in the same manner as they are granted access to the records in the statistics database 20. Employees may learn of the current working status of another employee, for example, by querying the real-time database 30. For example, an employee in a department may query the real-time database 30 to learn the whereabouts of another employee in the same department, when that employee is expected to return, and the reason for that employee's absence.

The system 10 may update the real-time database 30 as information is made available, either from the employees themselves or as obtained from other management systems. However, certain preferred embodiments utilize mobile applications installed on the user's mobile phones that may be employed to track an employee. Information obtained from each respective mobile application may be used to update corresponding records in the statistics database 20 and real-time database 30.

Figure 16:
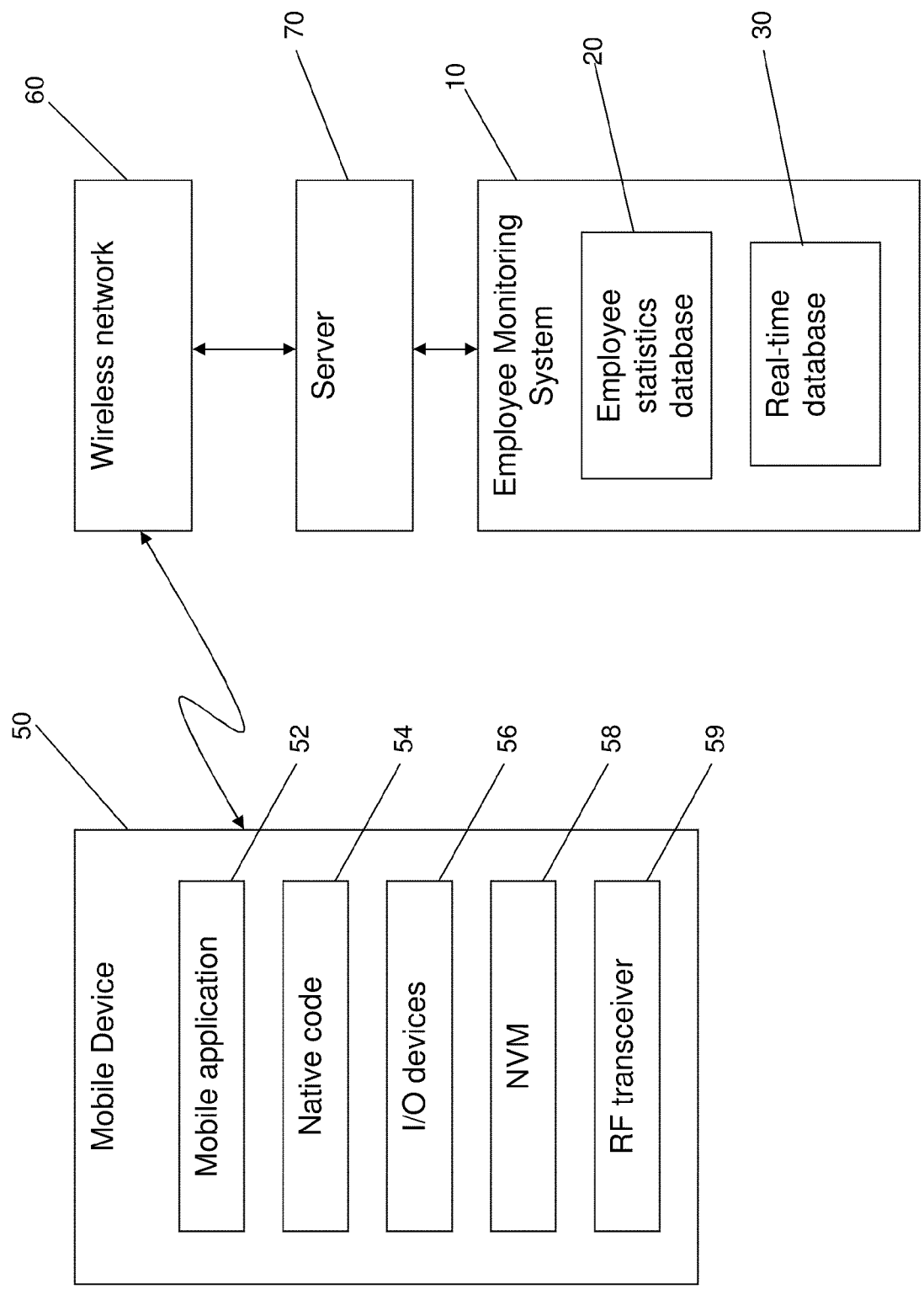
FIG. 16 is a diagram of an embodiment system interfacing with an embodiment mobile device.

As shown in FIG. 16, an employee's mobile device 50 may be in wireless communications with a wireless network 60 in a standard manner. Connected to the wireless network 60 is a server 70 that is able to send to and receive information from the mobile device 50 via the wireless network 60, as known in the art. A mobile application 52 may be installed on each employee's mobile device 50, as, for example, a Java applet, utilizing, for example, Java Application Server (Open ESB) code to communicate with the main system 10 via the server 70. It will be appreciated that the server 70 and system 10 may be installed on the same machine, though they are indicated as separate devices in FIG. 16. The installed applet 52 may permit each employee to use the mobile device 50 to connect to a dedicated Servlet or Web Service, depending upon whether or not the mobile device 50 supports direct Web connections. The information may be stored on the server 70, and periodically pulled by the system 10 to update the databases 30 and 40. Consequently, the mobile device 50 is communicatively connected to the employee monitoring system 10, and in particular, with the CPU 12 of the employee monitoring system 10. The CPU 12 can thus receive and process employee-related data from the mobile device 50, via the wireless network 60 and server 70, and transfer employee-related data to the mobile device 50. Secure connections may be employed between the mobile devices 50 and the server 70; for example, https connections may be used for all communications. In such embodiments, each mobile client 50 may identify itself with a certificate; similarly, the server 70 may identify itself to the client 50 with a certificate, and in this way both the server 70 and client 50 know that the communications are secure and with trusted partners. When communicating with the server 70, each employee may be identified by an employee ID and company ID.

The mobile device 50 will typically include native code 54 that is used to control input/output (I/O) devices 56 in a standard manner, and to control a radio frequency (RF) transceiver 59 to exchange data with a wireless network 60 using known wireless technologies. The wireless network 60 then may exchange this data with the server 70, which in turn may exchange it with the employee monitoring system 10 to update the databases 20, 30. The mobile application 52 may interface with the native code 54 to also control the I/O devices 56 to obtain input from the user and to present output to the user. Utilizing the native interface code 54, the mobile application 52 may present user interfaces to the employee that permits the employee to enter information, which may be subsequently provided to and entered into the system 10. The mobile device 50 may also include non-volatile memory (NVM) 58, which may be used to store employee-related data entered by the user of the device 50; the mobile application 52 may interface with the native code 54 to cause such employee-related data stored within the NVM 58 to be periodically synchronized with the employee monitoring system 10 via the wireless network 60. It will be appreciated that the mobile application 52 itself may reside within the NVM 58. Together, the mobile application 52, native code 54, I/O devices 56, NVM 58 and RF transceiver 59 provide circuitry that is designed to provide the functionality discussed in the following.

Figure 17A:
FIGS. 17A and 17B show respective embodiment mobile devices in a clocked-out state that permits an employee to clock into work.
Figure 17B:
Figure 18A:
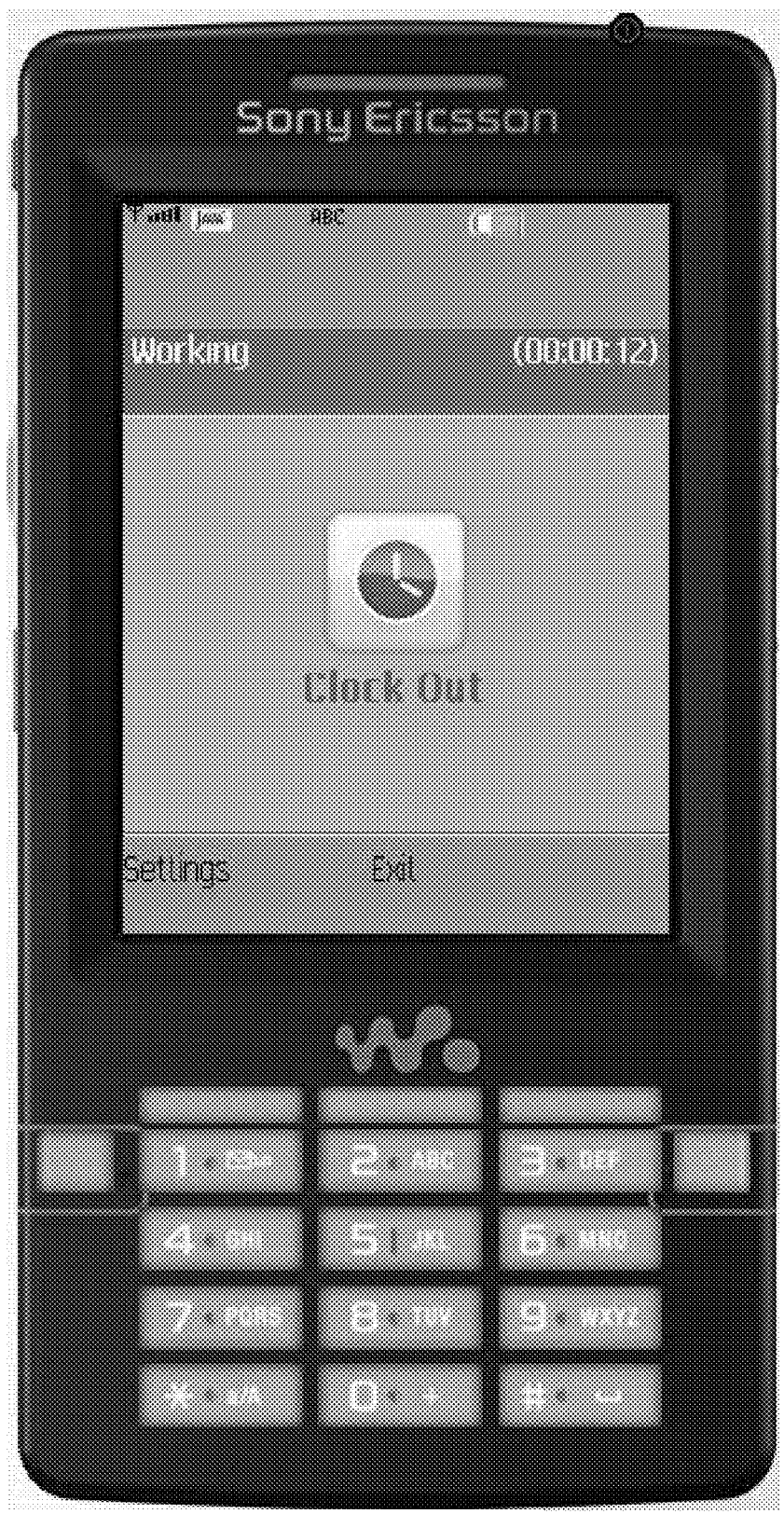
FIGS. 18A and 18B show respective embodiment mobile devices in a clocked-in state that permit an employee to clock out of work.
Figure 18B:
Figure 19:
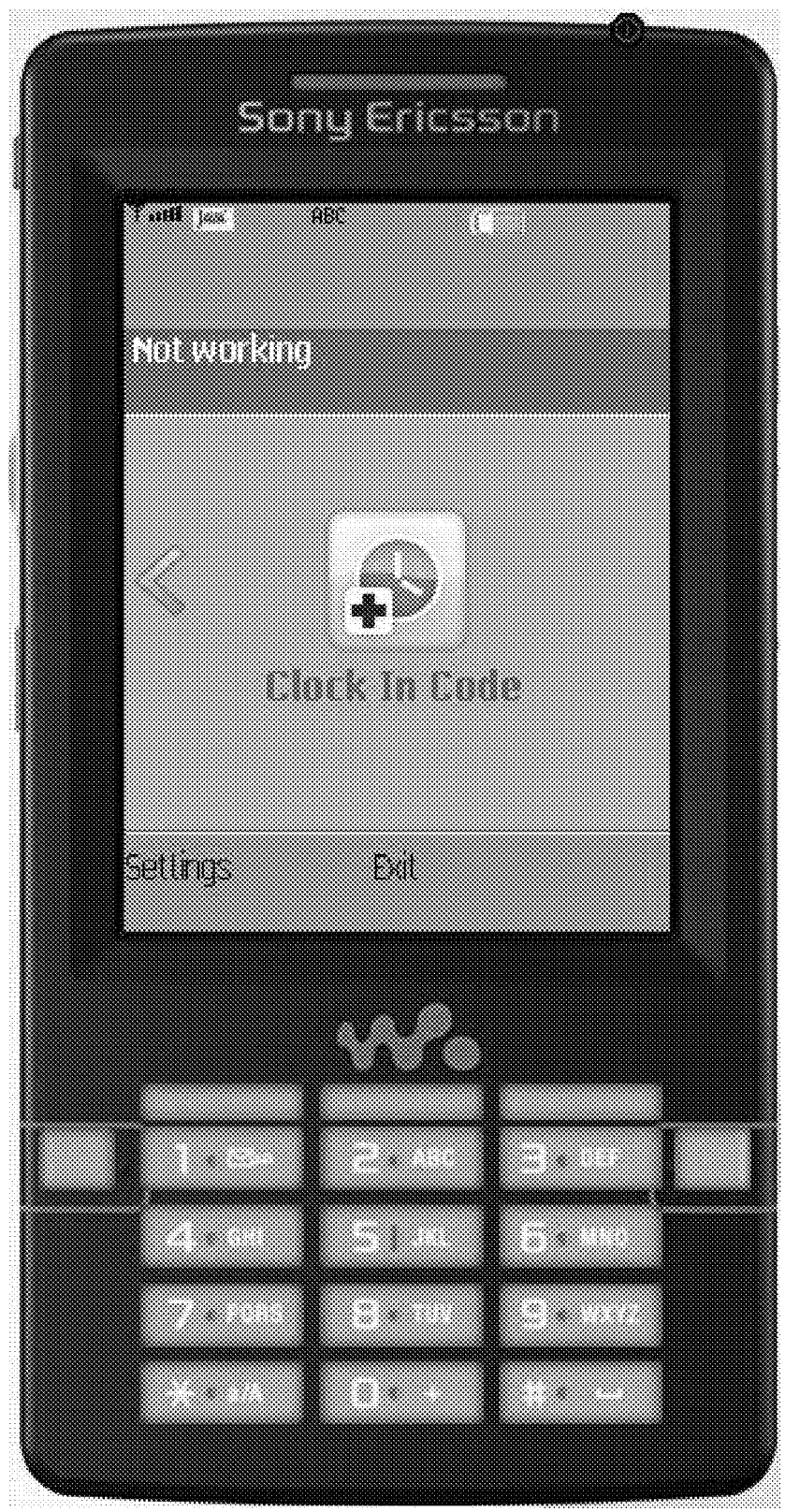
FIG. 19 shows a display on an embodiment mobile device that permits an employee to clock into work with a code to indicate the starting of a specific task or condition.
Figure 20A:
FIGS. 20A and 20B show displays on respective embodiment mobile devices that permit an employee to select a code to clock in with a specific task or condition.
Figure 20B:
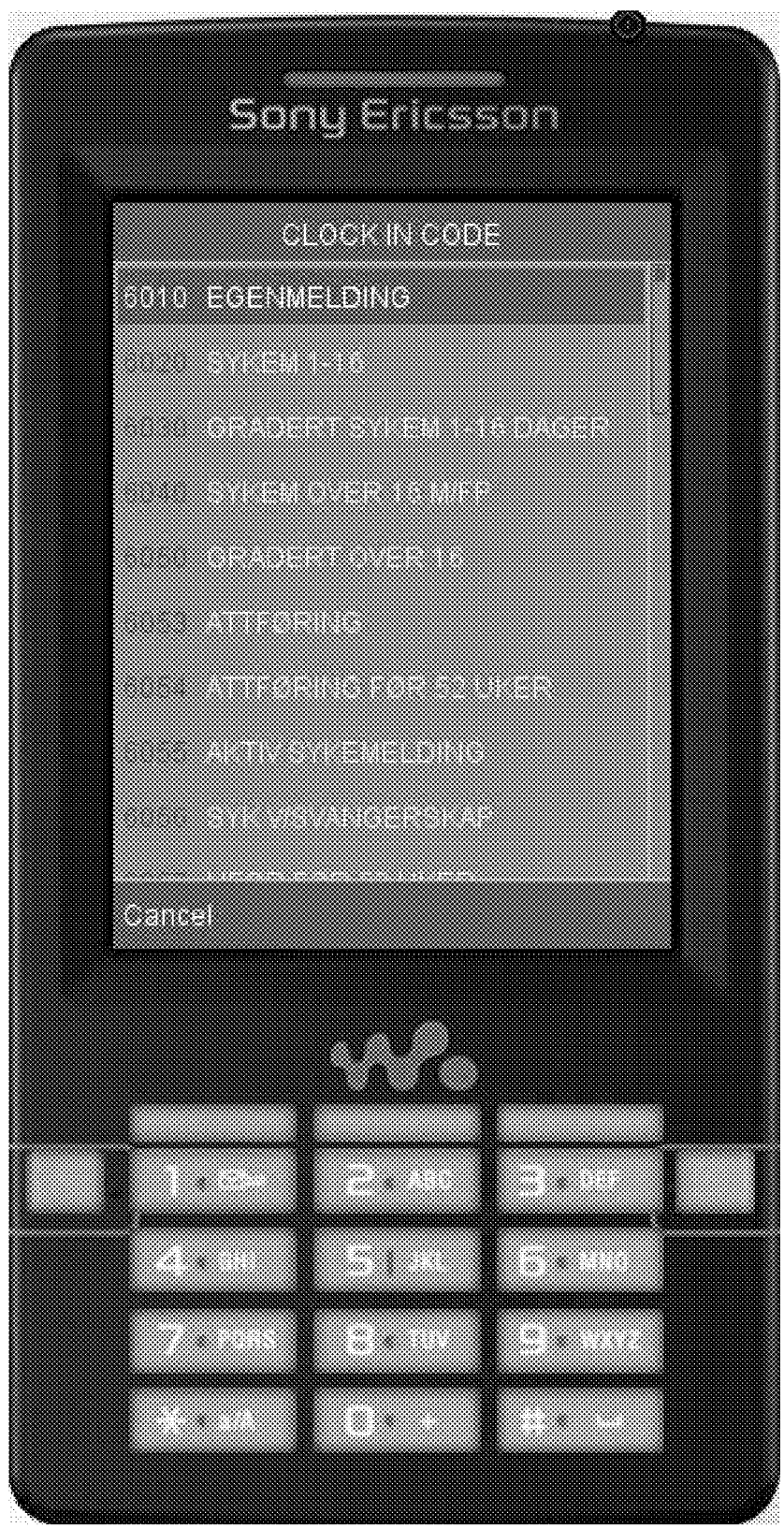
Figure 21A:
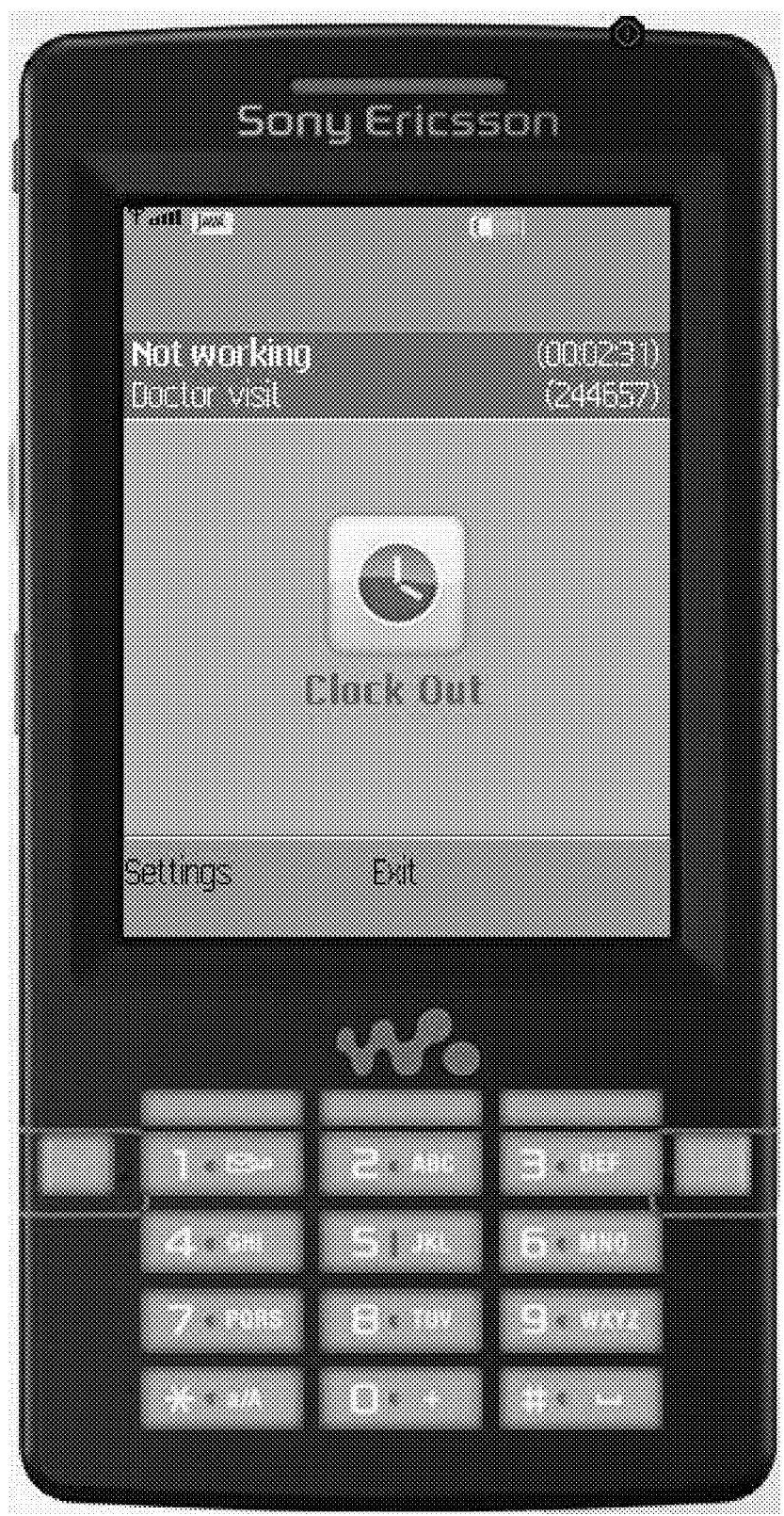
FIGS. 21A and 21B show display on respective embodiment mobile devices that permit an employee to indicate completion of a specific task or condition.
Figure 21B:
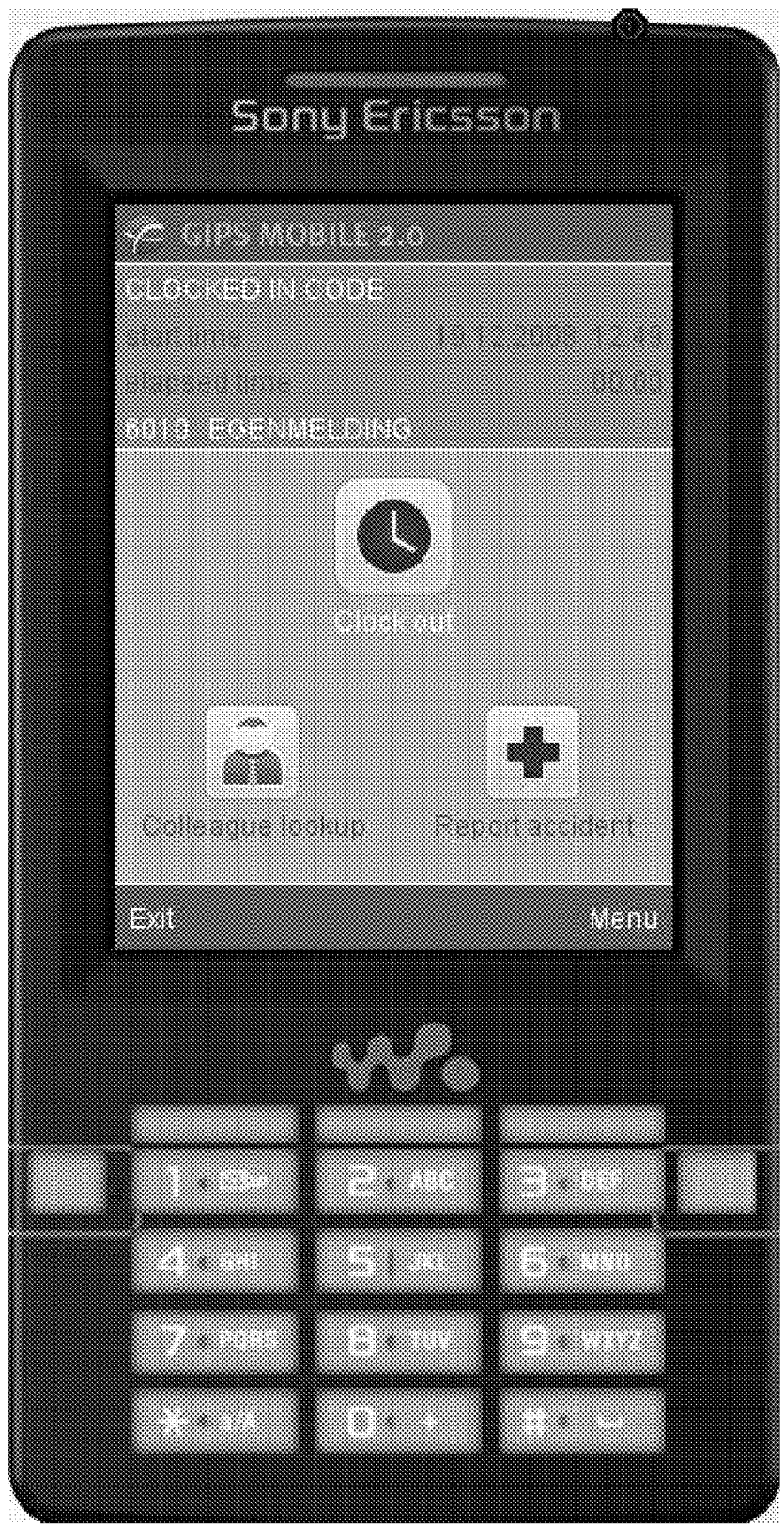
Figure 22:
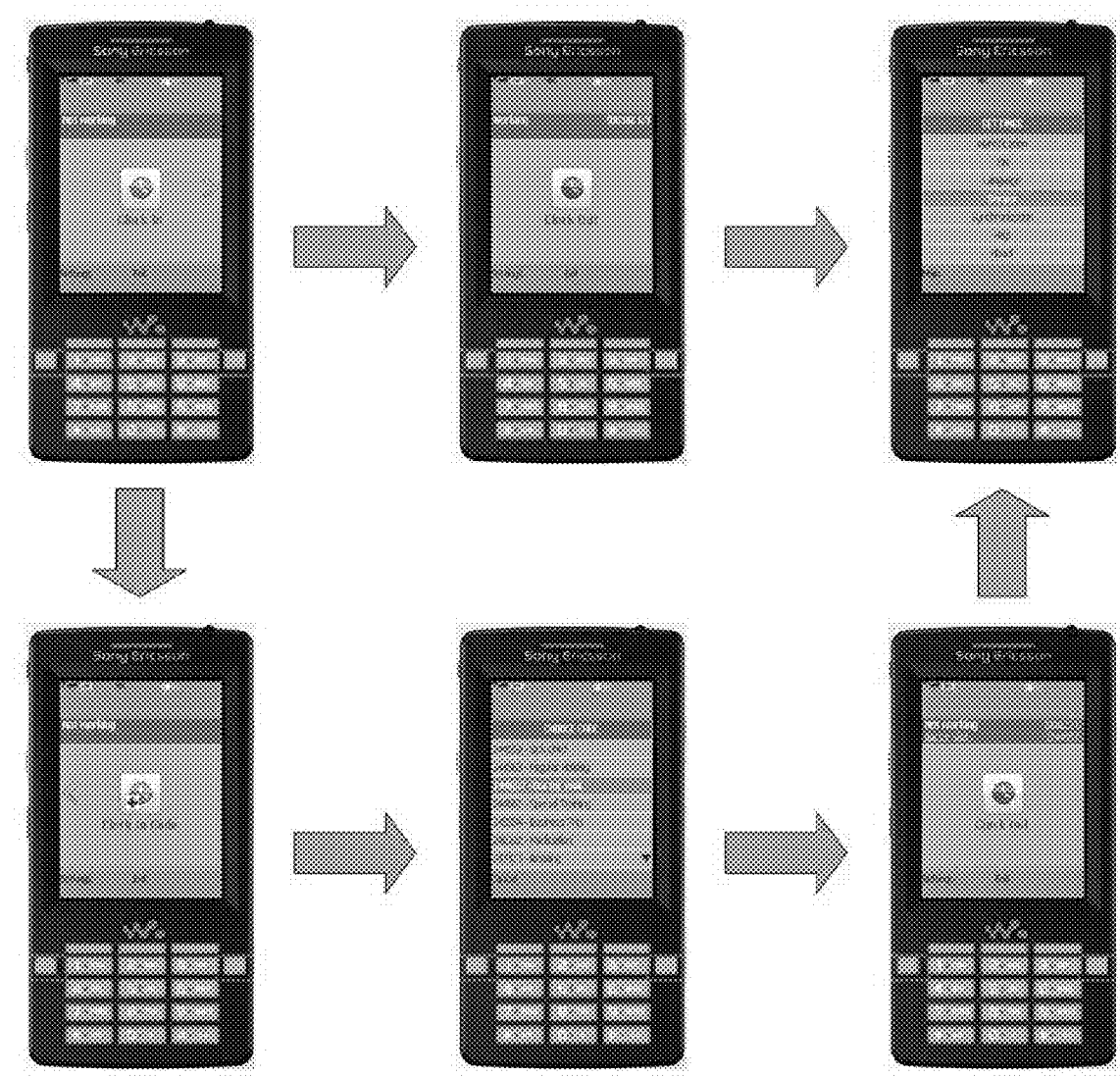
FIG. 22 provides a graphical representation of how an employee may use an embodiment mobile device.
Figure 23:
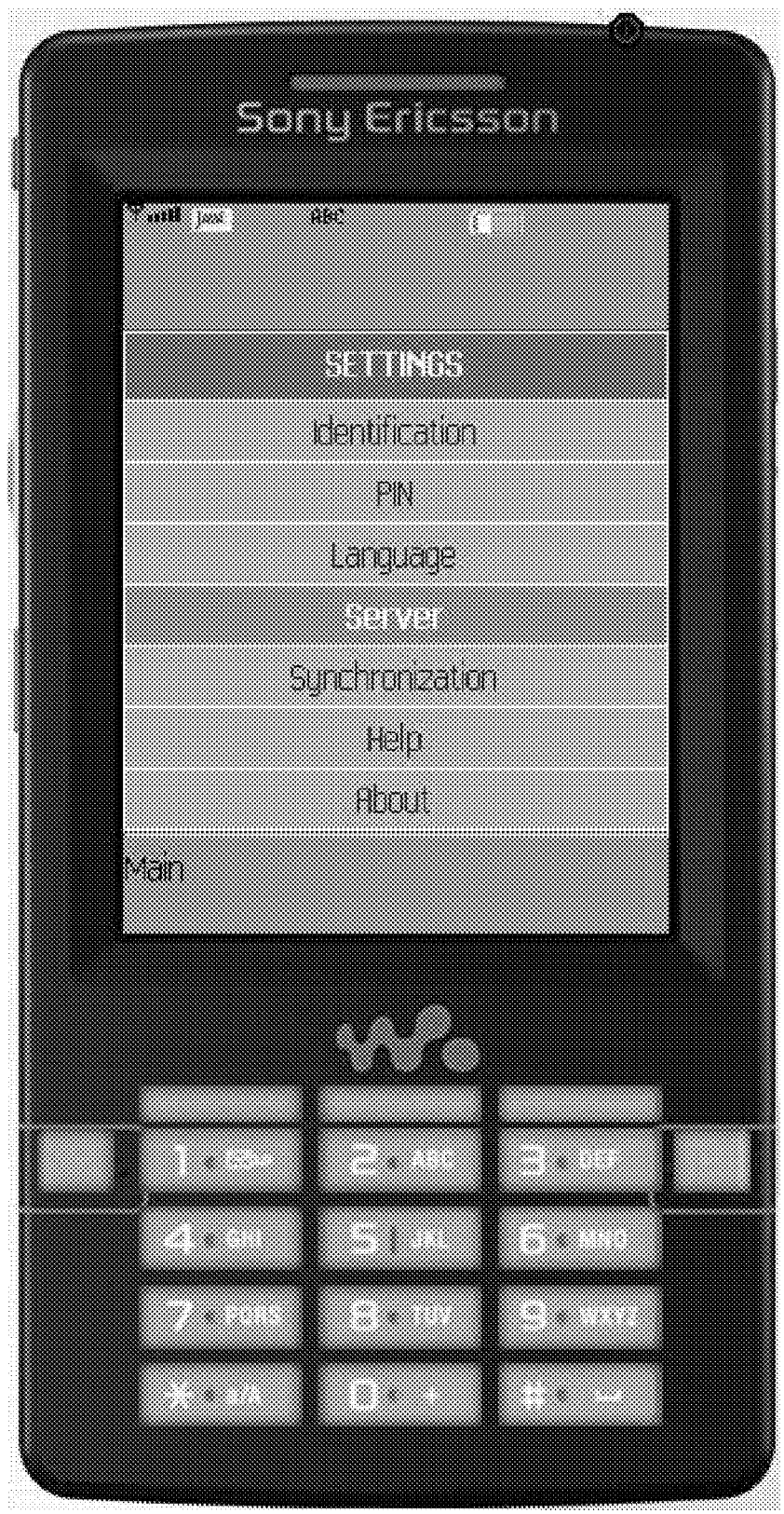
FIG. 23 shows a display on an embodiment mobile device that permits a user to configure and synchronize the mobile device.
Figure 24:
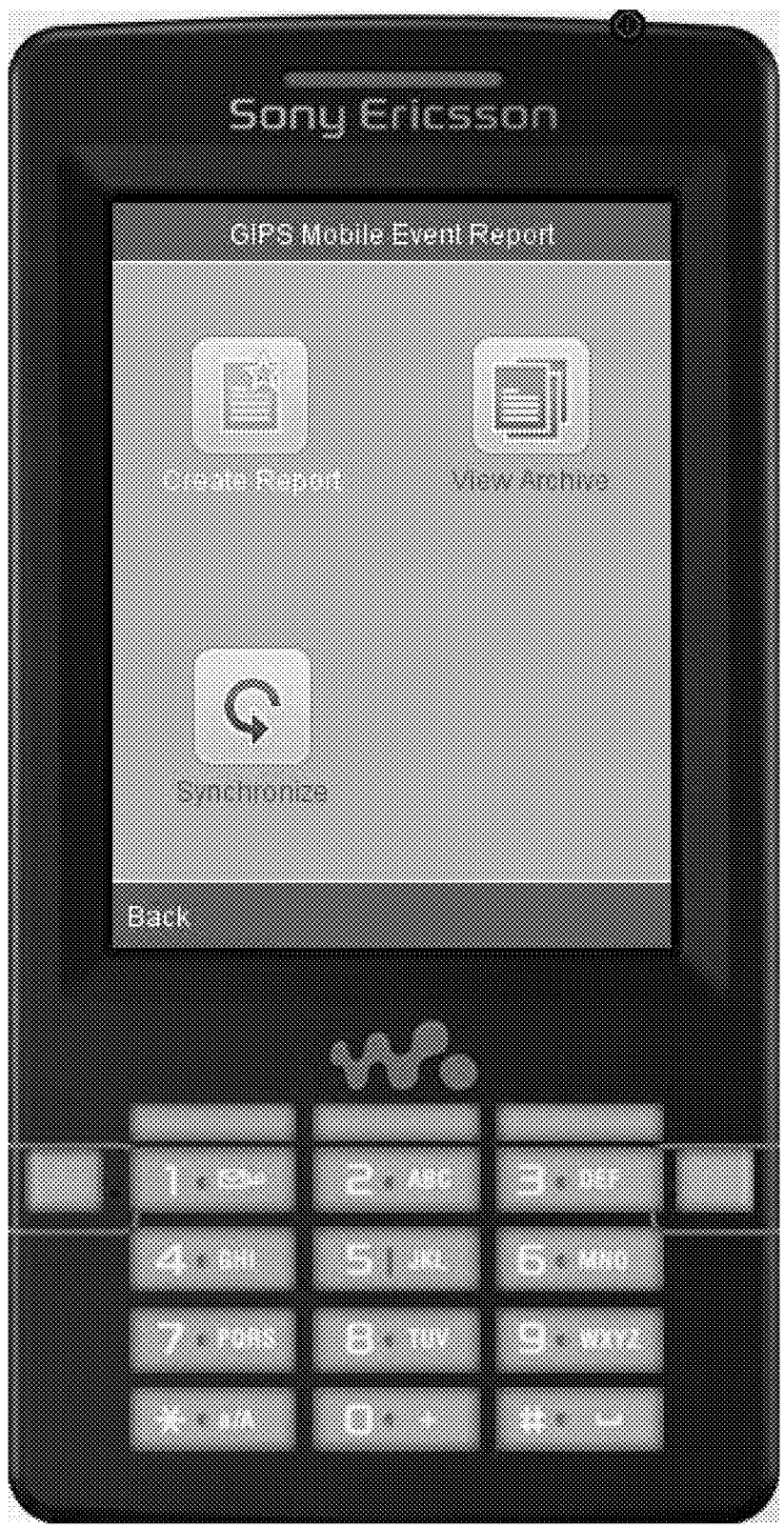
FIG. 24 shows a display on another embodiment mobile device that permits a user to generate reports using the mobile device.
Figure 25:
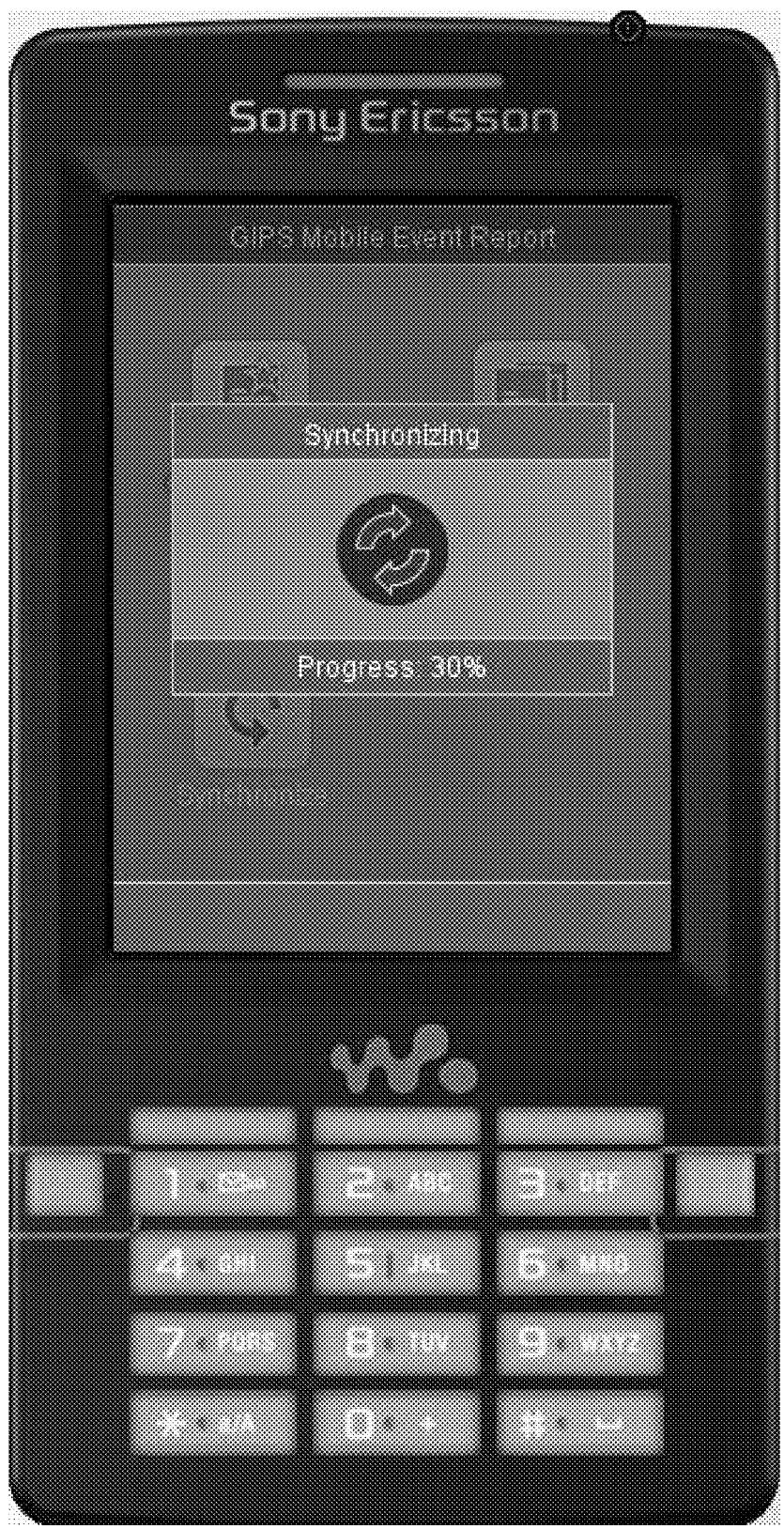
FIG. 25 shows an embodiment mobile device synchronizing with a remote server.
Figure 28:
FIG. 28 shows a display on an embodiment mobile device that indicates to a user what data stored in non-volatile memory has been sent to a remote server.

As shown in FIGS. 17 and 18, the mobile device 50 may give an employee the ability to clock in and out of work, respectively, by providing clock-in and clock-out circuitry that utilizes the I/O circuitry 56 in conjunction with the mobile application 52 and native code 54 to generate clock-in and clock-out signals that are subsequently relayed to the employee monitoring system 10 via the wireless network 60 and the server 70. The clock-in circuit as provided by the mobile application 52 thus accepts data from the I/O circuitry 56 to generate a corresponding clock-in signal. Similarly, the clock-out circuit as provided by the mobile application 52 accepts data from the I/O devices 56 to generate a corresponding clock-out signal. As shown in FIGS. 19 and 20, employees can easily let their employer know when they are sick, when they expect to return back to work, their current location, etc., by way of clocking in with corresponding codes and user-input information, data related to all of which may then be transmitted to the server 70, stored in the NVM 59 or both. This related clocking-in data may include, for example, a clock-in event signal, a time related to the clock-in event signal, and an optional code settable by the user to indicate the starting or beginning of a particular task or event. Similarly, users may indicate when they have completed a certain task, such as a doctors visit, training, and so forth, by "clocking out" with a corresponding code, as shown by example in FIG. 21A with an employee "clocking out" from a visit to the doctor, data related to all of which is then transmitted to the server 70; an alternative embodiment I/O interface for clocking out from a specific code is shown in FIG. 21B. This related clocking-out data may include, for example, a clock-out event signal, a time related to the clock-out event signal, and an optional code settable by the user or taken from the most recent clock-in signal, which indicates the completion of a specific task or event. FIG. 22 provides a graphical flow chart, showing how an employee may use an embodiment mobile device 50 to clock into and out of work, and also indicates the starting and completion of specific tasks or conditions by clocking in and out using corresponding codes. As shown in FIG. 23, the mobile device 50 may include an interface, as provided by the mobile application 52, that permits the user to set various settings, such as the user's identification information, and the logical address of the server 70. The mobile device 50 may also include circuitry, such as via the mobile application 52, that provides to the user an option to synchronize the employee-related data currently held within the NVM 58 by the mobile device 50 with the server 70. FIG. 24, for example, shows an embodiment I/O interface that permits the user to select whether or not to synchronize employee-related data held in the NVM 58 with the server 70. As shown in FIG. 25, the circuitry within the mobile device 50 may indicate to the user when synchronization is occurring, and the progress of such synchronization. Moreover, as shown in FIG. 28, the mobile application 52 may present to the user a list of employee-related data files held within the NVM 58 and the status of each such file, such as "sent" (i.e., sent to the server 70 for synchronization purposes) or merely "save" (i.e., not yet synchronized with the server 70).

Figure 26A:
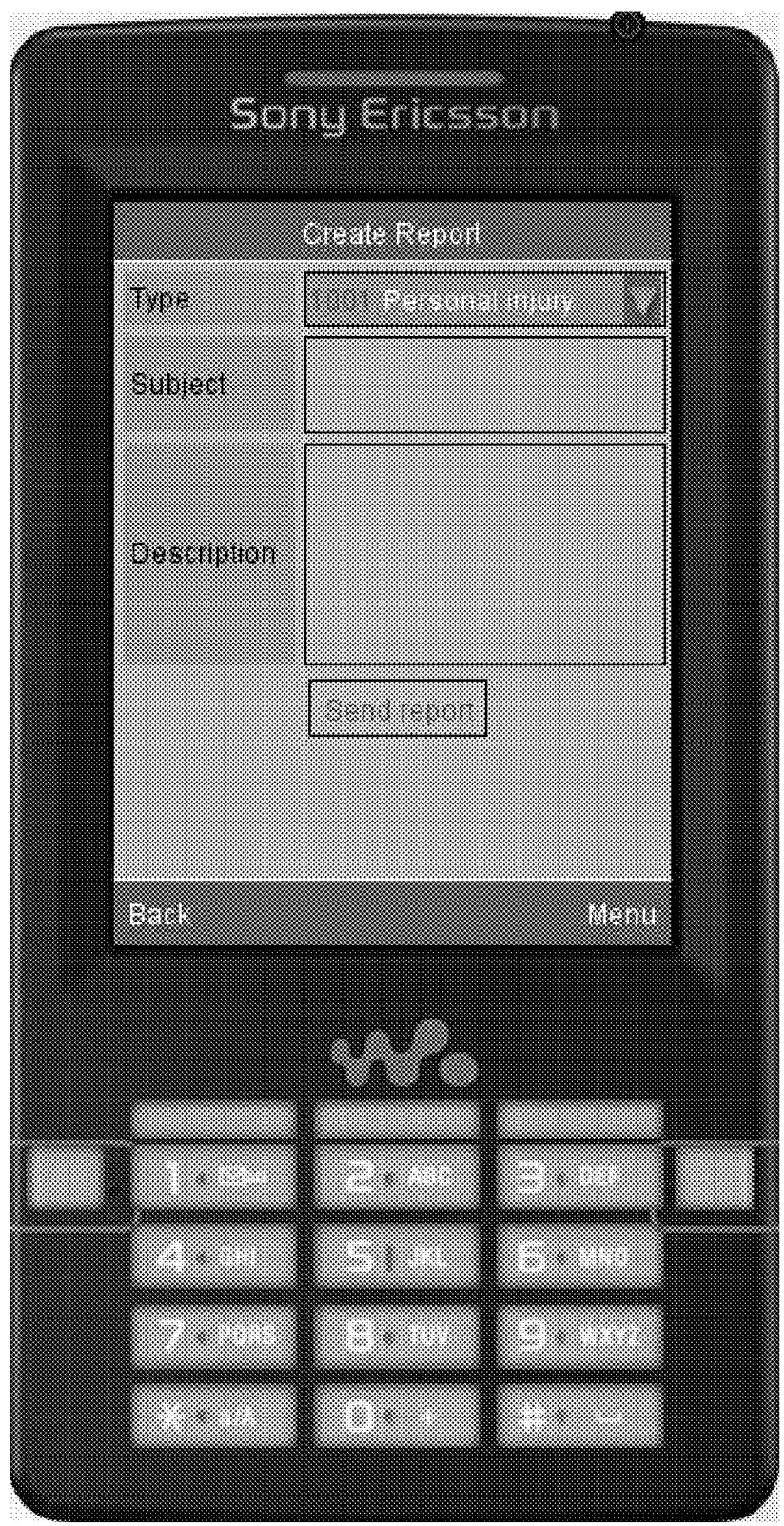
FIGS. 26A and 26B show a user input/output interface on an embodiment mobile device that permits a user to create and send a report to a remote server.
Figure 26B:
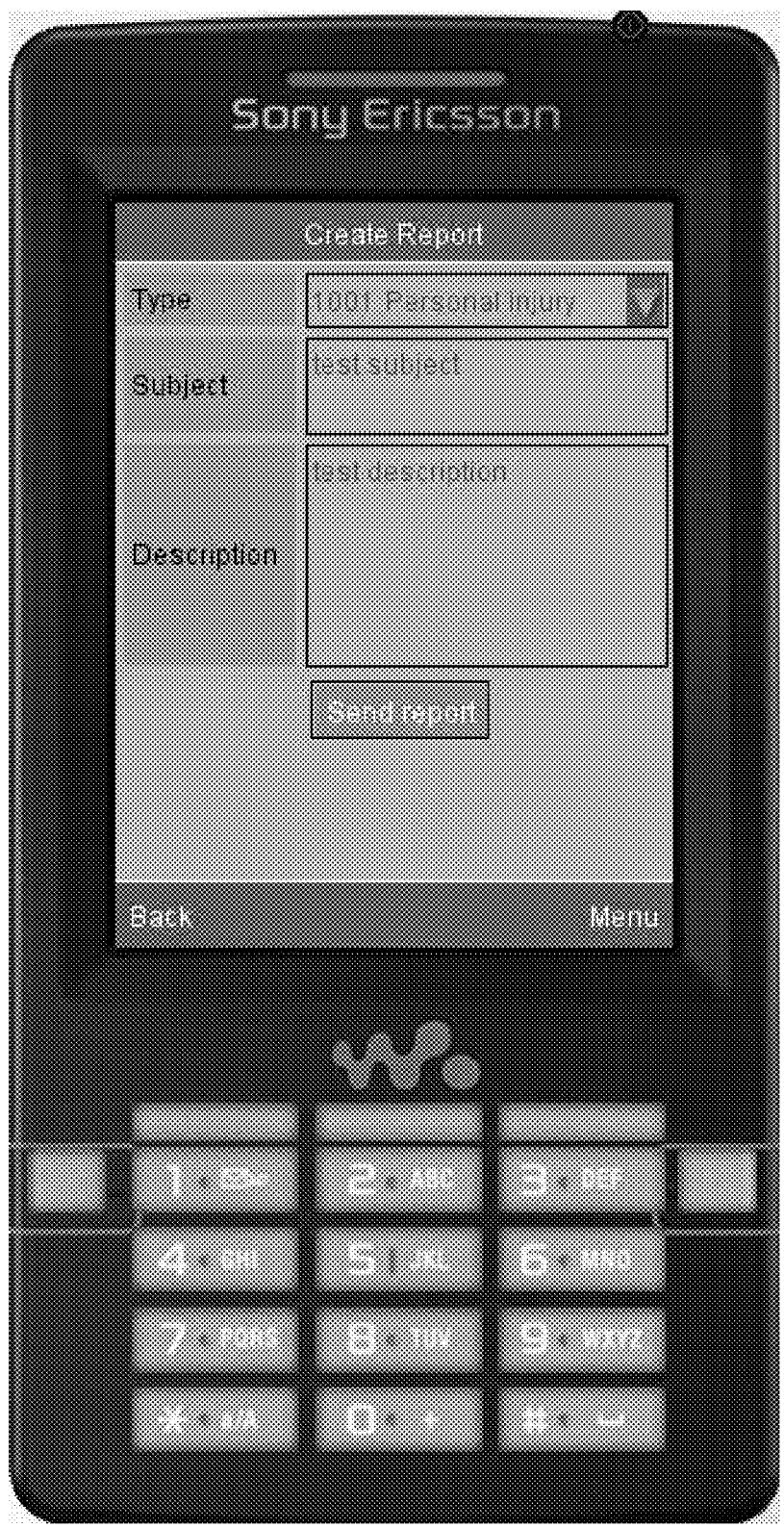

As shown in FIG. 26, certain embodiment mobile devices 50 and related mobile applications 52 and circuitry, permit a user to generate a report. Such reports may include predefined types that the user may select, such as "Personal Injury," a user-definable subject, and a user definable description. Data related to a report entered by a user via the I/O circuitry 56 may be saved in the NVM 58 until the next synchronization cycle.

Figure 27:
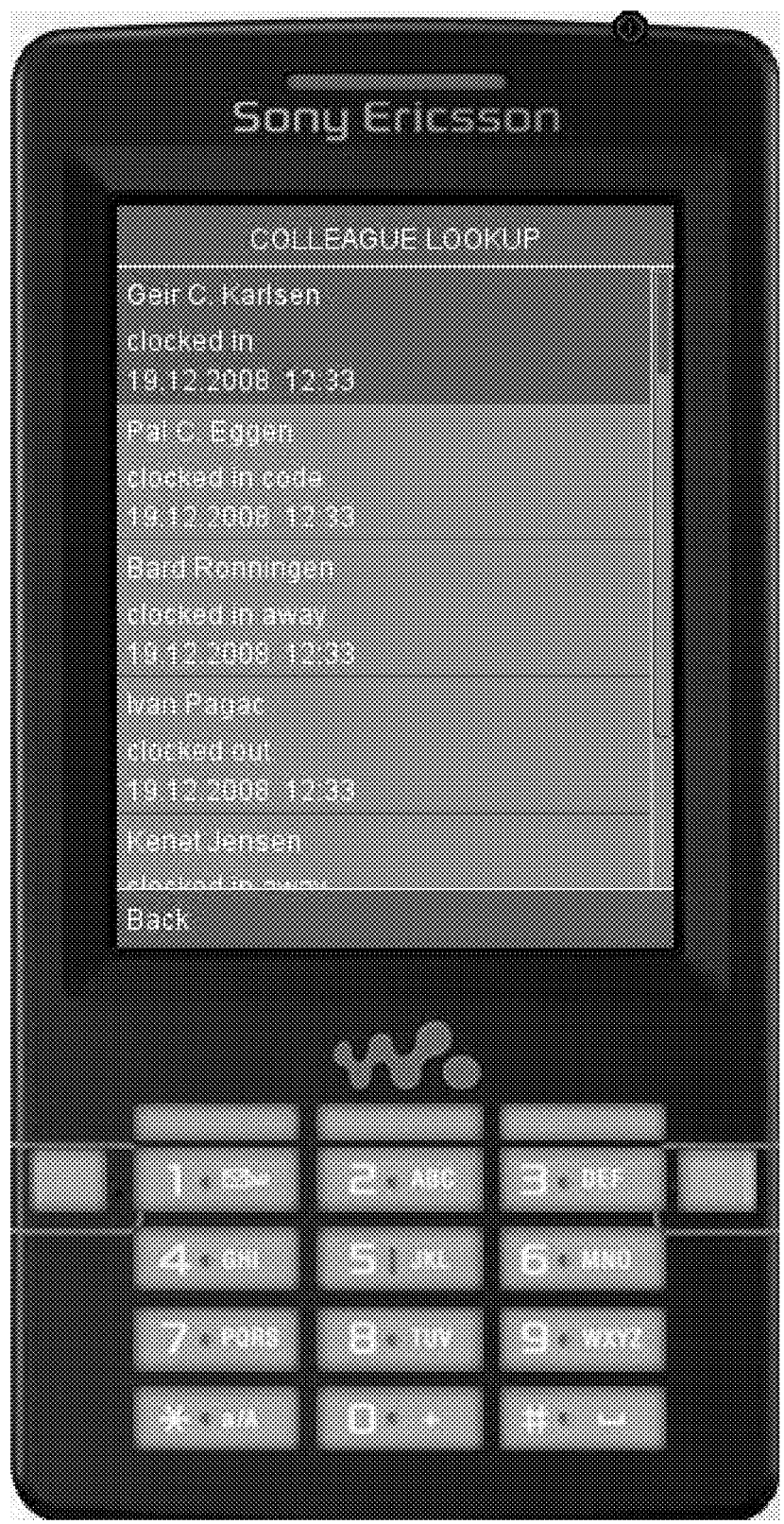
FIG. 27 shows an embodiment mobile device that permits the user to view the status of fellow employees.

The mobile application 52 may control the RF transceiver 59, via the native code 54, to request data from the employee monitoring system 10. For example, the mobile device 50 may request the most recent status information of each employee to which the user of the mobile device 50 has access, as shown in FIG. 27. Hence, when processing requests from a mobile device 50, the node with which the user of the mobile device 50 is associated may be used to determine what access rights the user has within the monitoring system 10, and thus what kind and types of data may be transmitted to the mobile device 50. As shown in FIG. 27, the user of mobile device 50 may contact the server 70 to determine what other users in the department are doing, who is present, or both. Hence, using the mobile application 52, employees may look up a colleague from the same workgroup and always know whether the colleague is presently available, and if not, what is the reason for the unavailability, and what is the expected time when he or she will be available.

All the information sent from the mobile device 50 may be collected by the system 10 via the server 70, where the data can be reviewed and followed up by people from different management levels. This data may be processed by the system 10 as "untreated" data, and hence may be subsequently processed for entry into, for example, the database associated with the code calendar view and reports. In case the mobile device 50 is without connection to the wireless network 60, all employee-related data may be stored into the nonvolatile memory 58 of the mobile device 50 and sent later when the connection again is available so that employee-related data is not lost. Additionally, each mobile device 50 may use a network connection only when sending or retrieving data, as indicated by the synchronization feature shown in FIGS. 23-25. Hence, the application 52 does not require a permanent connection, and so there will be no unnecessary air time and battery usage.

Using any of the access systems described above, such as the mobile device 50, through the system 10 or through a computer in a networked connection with the system 10, the program code 16, applet 52 or both may provide a search system with an auto-complete feature so that a user needs only to type in a portion of a name or an employee ID number and is then provided with a list of matches, but only for those portions of the organization the user has access to.

The system 10 may be provided a plurality of standardized forms for entering user data, presenting reports and the like. These standardized forms may differ depending upon the organization type, country etc. To avoid redundancy and potential user confusion, an external system may be provided for generating forms, in which each form is tagged by type and country. Each system 10 may then be customized to only have available forms that are appropriate for the organization using the system 10 (i.e. a Swedish company does not need Norwegian application forms).

Certain aspects of various embodiments provide methods and related systems for encoding the hierarchical, tree-like structure into a database of the system 10, such as into the employee statistics database 20. As earlier described, such hierarchical trees are typical data structures which find analogs in real-life organizational structures. The most common and widely used database systems are Relational Database Management Systems (RDBMS) which unfortunately are not designed to natively store hierarchical data. Methods are thus required to encode such hierarchical information into a RDBMS. For example, hierarchical database systems exist which naturally store data in a tree-like format. The disadvantage of such databases is that they store only hierarchical data, and they tend to be slower (due, for example, in overhead incurred when traversing the tree). Alternatively, XML files provide single file data storage for trees. XML files may provide the desired functionality, but they are much better for exchanging data between systems than for naturally storing the primary data. What would be ideal is if a relational database system could naturally store tree data in addition to providing its traditional functions.

There are at least two techniques for managing tree-like data structures in relational database systems. The first, which is the easier of the two, is termed the adjacency model, in which each node in tree, except for the root node, has a pointer to its parent node. The adjacency model is easy to implement, as just the parent nodes need to be supported, and the whole tree, or just portions of the tree to limited depths, can later be retrieved. However, these functions may be relatively slow due to recursion in the scripting language (recursion uses memory exponentially with each traverse) and from too many queries against the database system. Alternatively, multiple table joins could be employed, but this may not be sufficiently dynamic, and may also be relatively messy to implement. The advantage of the adjacency model is that it is a relatively easy way to implement the tree.

The second technique, termed the nested sets model, is based on a modified preordering algorithm of traversing the tree. The nested sets model may employ more attributes (Left, Right, Level, and Parent Node), but the advantage of such systems may also be significant over systems that employ the adjacency model. The most significant advantage is speed, in that any retrieval operation is significantly faster and mechanisms exist to immediately obtain certain types of desired information, such as finding out how many children nodes are under a particular node, obtaining the path to a desired node, or determining if a node A is a descendent of a node B. As the nested sets model supports strong inheritance, there are almost unlimited possibilities for supporting operations of the data in terms of inheritance, such as access control or inheritance of single attributes.

By way of example, consider storing in a database a hierarchy of screens that are available for desktop computers:

```
                Screens
                  LCD
                    17"
                    19"
                      Dell
                      Philips
                        109T
                        109B
                        109P
                      Sony
                    20" and more
                  CRT
                    17"
                    19"
                    21" and more
```

One method is to store the data into a "Product" table as follows:

| Product ID | Title | Type | Level | Parent ID |
|---|---|---|---|---|
| 1 | Screens | Category | 1 | NULL |
| 2 | LCD | Category | 2 | 1 |
| 3 | 17" | Category | 3 | 2 |
| 4 | 19" | Category | 3 | 2 |
| 5 | Dell | Category | 4 | 4 |
| 6 | Philips | Category | 4 | 4 |
| 7 | 109T | Product | 5 | 6 |
| 8 | 109B | Product | 5 | 6 |
| 9 | 109P | Product | 5 | 6 |
| 10 | Sony | Category | 4 | 4 |
| 11 | 20" and more | Category | 3 | 2 |
| 12 | CRT | Category | 2 | 1 |
| 13 | 17" | Category | 3 | 12 |
| 14 | 19" | Category | 3 | 12 |
| 15 | 21" and more | Category | 3 | 12 |

Retrieving or manipulating this data is quite simple and does not require any further discussion here. Instead, the following focuses on the nested sets model for manipulation of the data.

Figure 29:
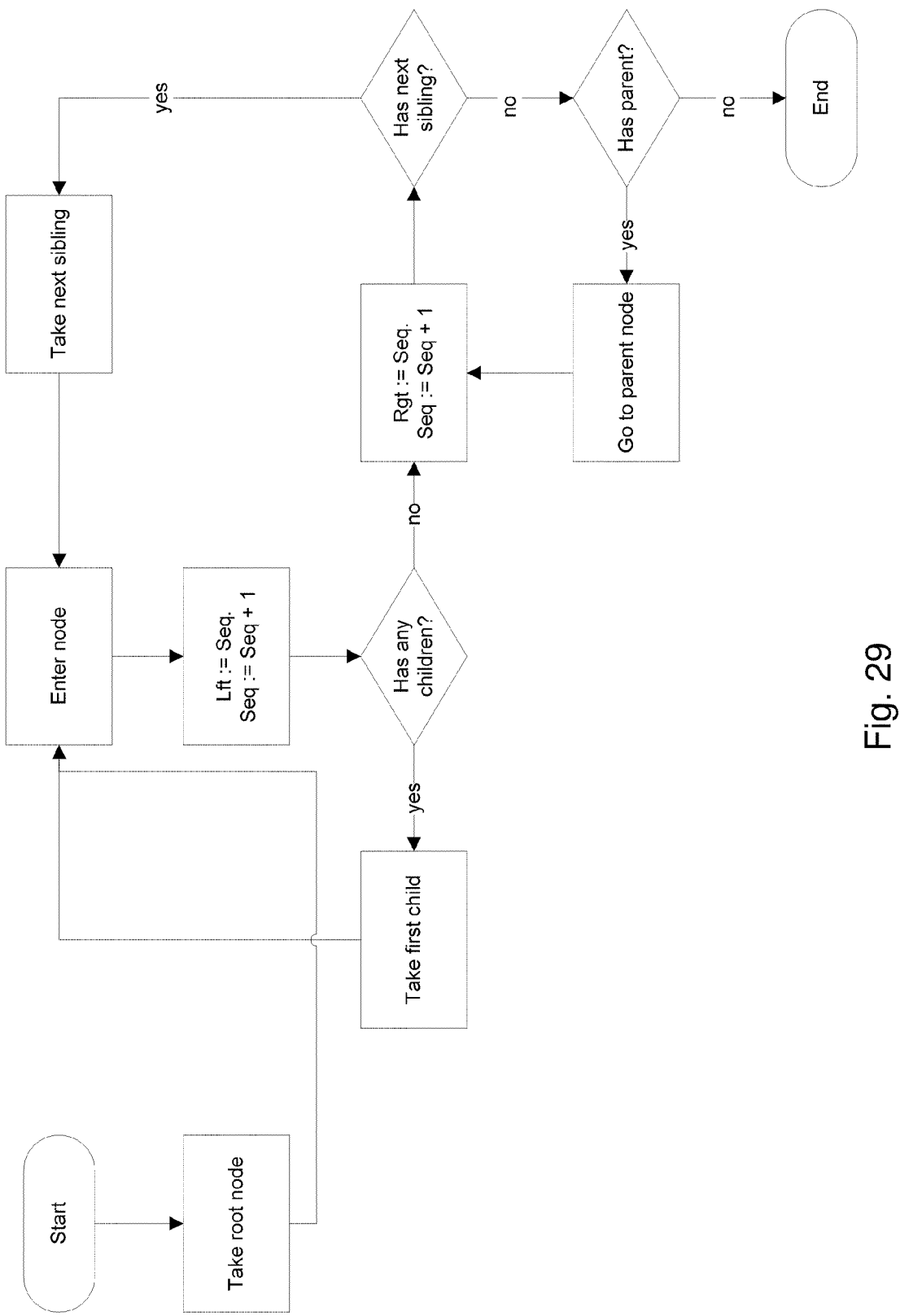
FIG. 29 is a flow chart of an embodiment nested set model.

A flow chart of an embodiment nested set model is depicted in FIG. 29. Preferred embodiments employ attributes "Lft" and "Rgt" to implement the nested sets model:

| Product ID | Title | Type | Level | Parent ID | Lft | Rgt |
|---|---|---|---|---|---|---|
| 1 | Screens | Category | 1 | NULL | 1 | 30 |
| 2 | LCD | Category | 2 | 1 | 2 | 21 |
| 3 | 17" | Category | 3 | 2 | 3 | 4 |
| 4 | 19" | Category | 3 | 2 | 5 | 18 |
| 5 | Dell | Category | 4 | 4 | 6 | 7 |
| 6 | Philips | Category | 4 | 4 | 8 | 15 |
| 7 | 109T | Product | 5 | 6 | 9 | 10 |
| 8 | 109B | Product | 5 | 6 | 11 | 12 |
| 9 | 109P | Product | 5 | 6 | 13 | 14 |
| 10 | Sony | Category | 4 | 4 | 16 | 17 |
| 11 | 20" and more | Category | 3 | 2 | 19 | 20 |
| 12 | CRT | Category | 2 | 1 | 22 | 29 |
| 13 | 17" | Category | 3 | 12 | 23 | 24 |
| 14 | 19" | Category | 3 | 12 | 25 | 26 |
| 15 | 21" and more | Category | 3 | 12 | 27 | 28 |

As shown above, hierarchically related information may be stored in a table comprising a plurality of records for each entry of hierarchical information. Each record includes a plurality of fields, such as "Product ID", "Title", "Level" (i.e., hierarchical level), "Parent ID" (i.e., product ID of the hierarchical parent of the current record entry), and two addition fields, "Lft" and "Rgt". These two fields or attributes "Lft" and "Rgt" describe the direction of traversal based upon graph theory. Lft is the entrance point, and Rgt is the exit point. When entering a node, Lft is set to the value of a sequence number that starts at the root node and increases by a predefined value "n" (preferably "n" equals one) each time a node is entered or exited. If a node has any children, the first child is entered and again the Lft sequence value is set. If a node has no children, the Rgt attribute is set to the nearest sequence number, and the traversal continues directly to the next node. At the end, the traversal returns to the root node.

In this embodiment, the difference between the root's Rgt and Lft sequence values, less one, provides the number of descendants. In a similar manner, any node can determine the number of descendants it has by applying the formula "Rgt−Lft−1". With these attributes, it is possible to determine a number of characteristics. For example, every node which has a Lft sequence value that is less than a node X is an ancestor of X; or, if the difference between a node's Rgt and Lft sequence values is exactly one, then the node is leaf. Reading such a tree from the database 20 then straightforward.

It is also possible to transform systems that employ the adjacency model to a nested sets model and thus obtain the advantages that the nested sets model enjoys.

The following provide examples for querying the database 20 when employing the above-described preferred embodiment nested sets model to encode a hierarchical tree:

Retrieving the whole tree:
SELECT * FROM Product ORDER BY Lft;
Retrieving only the leaf nodes:
SELECT * FROM Product WHERE Rgt=Lft+1 ORDER BY Lft;
Retrieving a single path:
SELECT
parent.Title
FROM
Product AS node,
Product AS parent
WHERE
node.Lft BETWEEN parent.Lft AND parent.Rgt
AND
node.Title='Philips'
ORDER BY
parent.Lft;

In certain embodiments, the nested sets model may be implemented as a PHP class, which can take care of data manipulations such as adding a new node to a specific location, deleting a node, copying and moving nodes, retrieving sub trees, etc. It is also possible to rewrite this class into any other procedural scripting language, such as Java or C++. The class may employ one or more parameters that describe what database table or tables are to be controlled by the class.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. An employee tracking system, comprising:
    at least a central processing unit; and
    a memory in communications with the central processing unit, the memory comprising program code executable by the central processing unit to perform the following steps:
        defining a hierarchical tree structure having a plurality of nodes classified to collectively represent an organizational structure within which a business organization arranges levels of management and lines of communication between said levels of management;
        defining a plurality of performance management rules specifying at least one employment condition defining at least a total number of days each of a plurality of employees of said business organization is entitled to be absent from work within a specified period of time;
        associating each of the plurality of employees with at least one node of the plurality of nodes in the hierarchical tree structure;
        determining a first hierarchical position of a first node of said hierarchical tree with which a first employee of said plurality of employees is associated and a second hierarchical position of a second node of said hierarchical tree with which a second employee of said plurality of employees is associated;
        determining access rights of said first employee based upon a relation between said first hierarchical position of said first node and said second hierarchical position of said second node;
        accessing first data stored in said memory in accordance with said access rights, said first data indicating when each of said plurality of employees was absent from work during said specified period of time and reasons why said employee was absent from work;
        comparing the first data against said performance management rules to determine which of said plurality of employees has violated a rule of said plurality of performance management rules; and
        generating a report comprising information of at least one of said plurality of employees who was determined to be in violation of the rule.

2. The employee tracking system of claim 1, wherein the utilizing step further comprises:
    determining a hierarchical position of a node in the hierarchical tree structure corresponding to a user requesting access to data stored in said memory; and
    utilizing the hierarchical position to determine access rights to at least a portion of the data; and
    wherein said portion of the data is exclusive of data relating to said user.

3. The employee tracking system of claim 1, wherein the comparing step further comprises utilizing corresponding performance management rules associated with a corresponding node of at least one of the plurality of employees.

4. The employee tracking system of claim 1, further comprising a mobile device in communication with the central processing unit, the mobile device comprising:
    input/output circuitry;
    a clock-in circuit for generating a clock-in signal according to data received from the input/output circuitry;
    a clock-out circuit for generating a clock-out signal according to data received from the input/output circuitry; and
    a radio frequency circuit for transmitting data related to the clock-in signal and the clock-out signal to the central processing unit via a wireless network.

5. A method for tracking performance statistics of a plurality of employees of a business organization, comprising:
    defining, by a central computing system, an organizational tree structure having a plurality of nodes classified to collectively represent an organizational structure within which said business organization arranges levels of management and lines of communication between said levels of management;
    defining, by said central computing system, a plurality of performance management rules specifying at least one employment condition defining at least a total number of days each of said plurality of employees of said business organization is entitled to be absent from work within a specified period of time;
    determining a first hierarchical position of a first node of said organizational tree structure with which a first employee of said plurality of employees is associated and a second hierarchical position of a second node of said organizational tree structure with which a second employee of said plurality of employees is associated;
    determining access rights of said first employee based upon a relation between said first hierarchical position of said first node and said second hierarchical position of said second node;
    obtaining, by said central computer device, first data in accordance with said access rights, said first data indicating when each of said plurality of employees was absent from work during said specified period of time and reasons why said employee was absent from work;
    using, by said central computing system, said first data to determine which of said plurality of employees has violated a rule of said plurality of performance management rules; and
    generating, by said central computing system, a report identifying at least one employee of said plurality of employees who was determined to be in violation of said rule.

6. The method according to claim 5, wherein at least a first node of said plurality of nodes is classified to represent a department of said business organization.

7. The method according to claim 6, wherein at least a second node of said plurality of nodes is classified to represent an employee within said department.

8. The method according to claim 7, wherein each of said first node and said second node has an identifier for said department assigned thereto.

9. The method according to claim 5, further comprising determining, by said central computing system, which node of said plurality of nodes in said organizational tree structure a user of said computer device is associated with based on log in information for said user.

10. The method according to claim 5, wherein said total number of days is defined by an allowable duration of maternity leave, an allowable duration of sick leave or an allowable duration of vacation.

11. The method according to claim 5, wherein said total number of days is defined by an allowable duration of personal sick time, an allowable duration of sick time due to a spouse or child, and an allowable duration of sick time due to a chronic condition.

12. The method according to claim 5, wherein said plurality of performance management rules further specifies a number of acceptable consecutive leave days per employee for a particular type of leave.

13. The method according to claim 5, wherein at least one of said plurality of performance management rules further specifies when follow-up with an employee is required due to excessive absenteeism.

14. The method according to claim 5, wherein at least one of said plurality of performance management rules further specifies an acceptable limit on tardy behavior for an employee of said business organization.

15. The method according to claim 5, wherein said first data is obtained from an external management system, a website, or a mobile communication device.

16. The method according to claim 5, further comprising performing actions, by said central computing system, to alert an employee of said plurality of employees when he/she is in violation of at least one of said plurality of performance management rules.

17. The method according to claim 5, further comprising generating, by said central computing system, a calendar in which each day of said calendar contains a coded entry selected based upon the work-related conduct of said employee as compared to said plurality of performance management rules.

18. The method according to claim 5, further comprising:
presenting, by said central computing system, an image of said organizational tree structure to said user;
receiving, by said central computing system, a user input selecting a node of said plurality of nodes within said organizational tree structure; and
in response to the reception of said user input, generating a report for said node which was selected by said user of said central computing system or a report for at least one node attached to said node which was selected by said user.

19. The method according to claim 5, wherein said report comprises information specifying a total number of hours for each of a plurality of types of leave for an employee and an amount of sick leave in comparison to work days for said employee.

20. The method according to claim 5, wherein said report comprises information specifying a total number of hours for each of said plurality of types of leave for a department and an amount of sick leave in comparison to work days for each department.

21. The method according to claim 5, further comprising performing actions, by said central computing system, to cause second data stored in an employee's mobile communication device to be periodically synchronized with at least a portion of said first data stored in said central computing system.

22. The method according to claim 5, further comprising receiving from an employee's mobile communication device a first signal including information specifying a time when an employee started a particular task and a second signal including information specifying a time when an employee finished said particular task.

* * * * *